(12) United States Patent
Chen

(10) Patent No.: US 7,599,752 B2
(45) Date of Patent: Oct. 6, 2009

(54) TUNING METHODS FOR FRACTIONAL-ORDER CONTROLLERS

(75) Inventor: YangQuan Chen, Logan, UT (US)

(73) Assignee: Utah State University, Logan, UT (US)

(*) Notice: Subject to any disclaimer, the term of this patent is extended or adjusted under 35 U.S.C. 154(b) by 297 days.

(21) Appl. No.: 11/435,916

(22) Filed: May 17, 2006

(65) Prior Publication Data

US 2006/0265085 A1 Nov. 23, 2006

Related U.S. Application Data

(60) Provisional application No. 60/681,791, filed on May 17, 2005.

(51) Int. Cl.
G06F 19/00 (2006.01)
(52) U.S. Cl. .......................................... 700/41; 700/28
(58) Field of Classification Search .................. 700/100, 700/28, 41
See application file for complete search history.

(56) References Cited

OTHER PUBLICATIONS

Chen, YangQuan, "Ubiquitous Fractional Order Controls?," Center for Self-Organizing and Intelligent Systems (CSOIS), Department of Electrical and Computer Engineering, Utah State University, Logan, Utah 84322-4160, USA, corresponding author: yqchen@ece.usu.edu; URL: http://www.csois.usu.edu/people/yqchen, http://mechatronics.ece.usu.edu/foc/fda06/plenary-article.pdf, Porto, Portugal, Jul. 21, 2006, 12 pgs.

(Continued)

Primary Examiner—Michael D Masinick

(57) ABSTRACT

A method for tuning a fractional-order proportional-integral (PI) controller $$C(s) = K_p\left(1 + K_i\frac{1}{s^\alpha}\right)$$

includes deriving values for $K_p$, $K_i$, and $\alpha$ that satisfy a flat phase condition represented by $$\angle\frac{dG(s)}{ds}\Big|_{s=jw_c} = \angle G(s)|_{s=jw_c}.$$

$K_p$ is derived to ensure that a sensitivity circle tangentially touches a Nyquist curve on a flat phase. $K_i$ and $\alpha$ are derived to ensure that a slope of a Nyquist curve is approximately equal to the phase of an open loop system at a given frequency. A method for tuning a PI controller $$C(s) = K_p\left(1 + K_i\frac{1}{s^\alpha}\right)$$

where the gain crossover frequency $w_c$ is known includes obtaining measurements of $\angle P(jw_c)$ and $|P(jw_c)|$ of an unknown, stable real plant $P(s)$ using iterative relay feedback tests, and approximating the derivative of the plant phase, $\angle P(jw_c)$, provided by the relationship $$s_p(w_c) = w_c\frac{d\angle P(jw)}{dw}\Big|_{w_c} \approx \angle P(jw_c) + \frac{2}{\pi}[\ln|K_g| - \ln|P(jw_c)|],$$

wherein $|K_g|=P(0)$ is the static gain of the real plant $P(s)$.

32 Claims, 31 Drawing Sheets

OTHER PUBLICATIONS

Xue, Dingyü, et al., "A Comparative Introduction of Four Fractional Order Controllers," School of Information Science and Engineering Northeastern University, Shenyang 110004, P R China, Center for Self-Organizing & Intelligent Systems (CSOIS), Dept. of Electrical and Computer Engineering, College of Engineering, Utah State University, UT 84322-4160, USA, Proceedings of the 4th IEEE World Congress on Intelligent Control and Automation (WCICA02), http://www.ece.usu.edu/csois/people/yqchen/paper/02C08_pub072.pdf, Shanghai, China, Jun. 10-14, 2002, pp. 3228-3235.

Chen, YangQuan, et al., "Relay Feedback Tuning of Robust PID Controllers With Iso-Damping Property," Proceedings of the 42nd IEEE Conference on Decision and Control,WeM06-2, Hawaii, USA, http://www.acae.cuhk.edu.hk/cdc2003, 2 pgs.; http://www.ece.usu.edu/csois/people/yqchen/paper/03C13_1_cdc03.pdf, Dec. 2003, pp. 2180-2185.

Monje, C. A., et al., "On Fractional PIλ Controllers: Some Tuning Rules for Robustness to Plant Uncertainties," © 2003 Kluwer Academic Publishers, Printed in the Netherlands, Nonlinear Dynamics, http://www.kluweronline.com/issn/0924-090X, 2 pgs.; PDF, prepublication online Aug. 24, 2004; http://ipsapp007.kluweronline.com/ips/frames/fasttracks.aspx?J=5053&N=ForthcomingPapers &ADS=0, May 12, 2003, pp. 1-18, vol. 38, Nos. 1-4, Dec. 2004, http://www.ece.usu.edu/csois/people/yqchen/paper/04J07_nonlinear_v2.pdf, pp. 369-381.

Monje, C. A., et al., "Proposals for Fractional PIλDμ Tuning," The First IFAC Symposium on Fractional Differentiation and its Applications 2004 Bordeaux, http://www.bordeaux-tourisme.com, France, http://www.ece.usu.edu/csois/people/yqchen/paper/04C07_fractionalpid_tuning_v2.pdf, Jul. 19-20, 2004, 6 pgs.

Chen, YangQuan, "Robust PID Controller Autotuning With a Phase Shaper," The First IFAC Symposium on Fractional Differentiation and its Applications 20 04 Bordeaux, http://www.bordeaux-tourisme.com, France, Jul. 19-20, 2004. http://www.ece.usu.edu/csois/people/yqchen/paper/04C09_paper_fda04.pdf, 7 pgs.

Monje, C. A., "Optimal Tunings for Fractional PIλDμ Controllers," a chapter in Fractional Derivatives an Their Applications. Part. 3: Systems analysis, implementation and simulation, systems identification and control. Editors: A. Le Mehauté, J. A. Tenreiro Machado, J. C. Trigeassou and J. Sabatier. UBooks, http://ubooks.de/html/start.htm, Augsburg, Germany, 2005, http://www.ece.usu.edu/csois/people/yqchen/paper/05BC04_FractionalPID.pdf, pp. 675-686.

Chen, YangQuen, et al., "Robust PID Controller Autotuning With An ISO-Damping Property Through A Phase Shaper," a chapter in Fractional Derivatives an Their Applications . Part. 3: Systems analysis, implementation and simulation, systems identification and control. Editors: A. Le Mehauté, J. A. Tenreiro Machado, J. C. Trigeassou and J. Sabatier. UBooks, http://ubooks.de/html/start.htm, Augsburg, Germany, 2005, pp. 687-706, http://www.ece.usu.edu/csois/people/yqchen/paper/05BC02 _fda04_book_vol3_no2_Chen_Utah-revised-final.pdf.

Monje, C. A., et al., "Auto-Tuning of Fractional Lead-Lag Compensators," IFAC http://www.ifac.cz/, 2 pgs., World Congress (16th), http://www.ifac.cz, http://www.ifac-control.org, 2 pgs., http://www.ece.usu.edu/csois/people/yqchen/paper/05C03_1FAC-04205fo-lead-lag.pdf, Jul. 4 to Jul. 8, 2005, 6 pgs.

Igor Podlubny, Fractional-Order Systems and PID-Controllers, IEEE Transactions on Automatic Control, Jan. 1999, pp. 208-214, vol. 44, No. 1, Utah State University, Utah.

C.C. Hang et al., Refinements of the Ziegler-Nichols tuning formula, IEE Proceedings-D, Mar. 1991, pp. 111-118, vol. 138 No. 2, Utah State University, Utah.

Crescencio Hernandez-Rosales et al., Embedded.com, Make a PI controller on an 8-bit micro, http://www.embedded.com/columns/technicalinsights/175801127?_requestid=85156, Jan. 4, 2006, Oct. 7, 2008, pp. 1-13.

J. I. Suarez et al., Spatial Path Tracking of an Autonomous Industrial Vehicle Using Fractional Order Controllers, Proceedings of ICAR 2003 (The 11th International Conference on Advanced Robotics),Jun. 30-Jul. 3, 2003, pp. 405-410, Coimbra, Portugal.

N. M. Fonseca Ferreira et al., Fractional-Order Hybrid Control of Robotic Manipulators, Proceedings of ICAR 2003 (The 11th International Conference on Advanced Robotics), Jul. 30-Jul. 3, 2003, pp. 393-398, Coimbra, Portugal.

A. Wallen et al., Loop-Shaping Design of PID Controllers with Constant TiTd Ratio, Asian Journal of Control, Dec. 2002, pp. 403-409, vol. 4, No. 4.

A. Karimi et al., PID Controller Design Using Bode's Integrals, IEEE Transactions Control Systems Technology, Nov. 2003, pp. 812-821, vol. 11, No. 6., Lausanne, Switzerland.

Aidan O'Dwyer, Imperial College Press, Handbook of PI and PID Controller Tuning Rules, http://books.google.com/books?id=xwkwOhZjk0IC&dg=handbook+of+PI+Controller &source=gbs_summary_s&cad=0, 2003, Oct. 8, 2008.

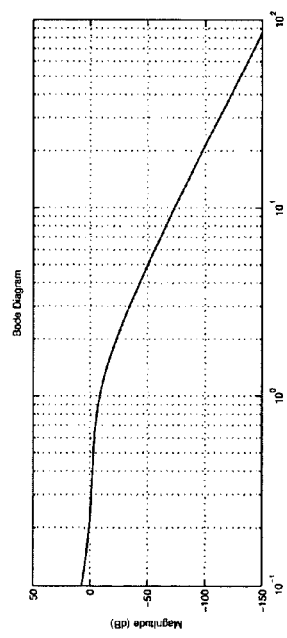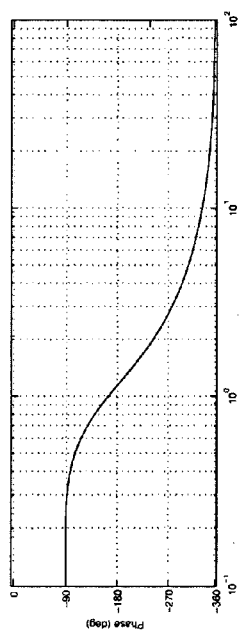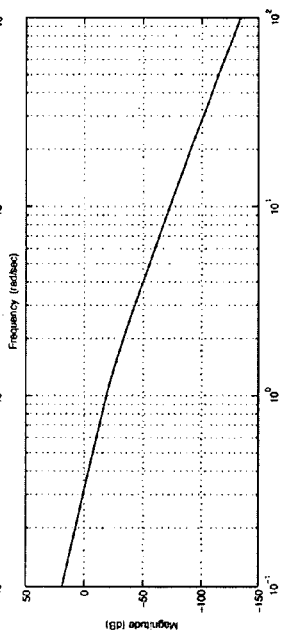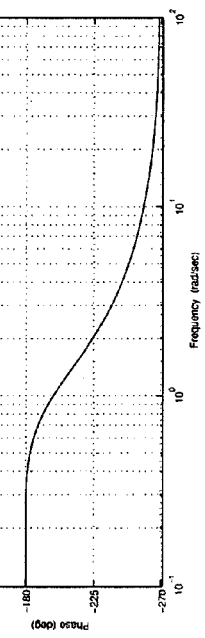
FIG. 17(a)        FIG. 17(b)

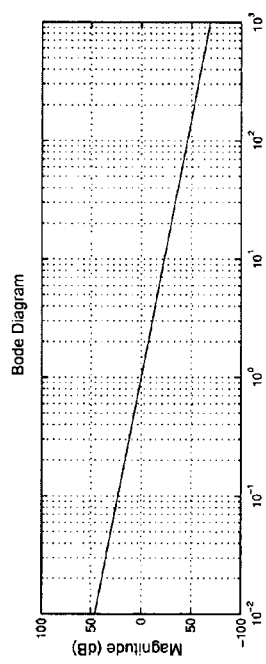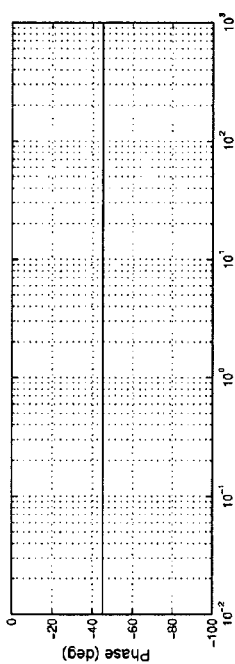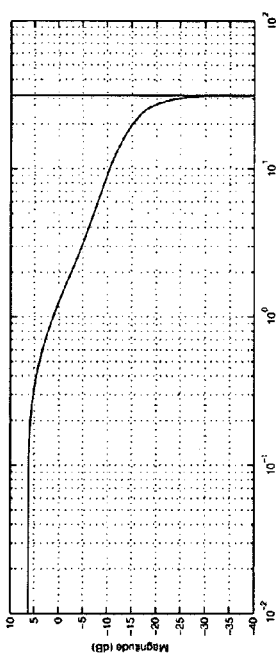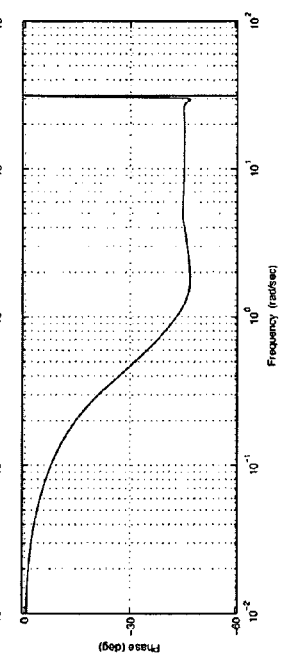
FIG. 18(a)    FIG. 18(b)

TUNING METHODS FOR FRACTIONAL-ORDER CONTROLLERS

RELATED APPLICATIONS

This application claims priority to U.S. Provisional Patent Application Ser. No. 60/681,791, entitled "Tuning Method for Fractional Order Controllers," filed May 17, 2005, which is herby incorporated by reference.

TECHNICAL FIELD

The present disclosure relates to tuning methods for fractional-order controllers.

SUMMARY OF THE DISCLOSURE

In industry, the vast majority of controllers are proportional-integral-derivative (PID) type. A PID controller is a common feedback loop component in industrial control systems, which are formulated through what is known as "control theory." The controller compares a measured value from a process with a reference setpoint value. The difference (or "error" signal) is then processed to calculate a new value for a manipulated process output that brings the process measured value back to its desired setpoint. Unlike simpler control algorithms, the PID controller can adjust process outputs based on the history and rate of change of the error signal, which gives more accurate and stable (or robust) control. It can be shown mathematically that a PID loop will produce accurate stable control in cases where other control algorithms would either have a steady-state error or would cause the process to oscillate.

Through the introduction of fractional-order calculus (FOC), the integral and the derivative actions can be implemented in fractional-orders. Fractional-order-PID (FO-PID) controllers introduce an additional degree of freedom and provide superior performance.

A new tuning method for a proportional-integral ($PI^\alpha$) controller design is proposed for a class of unknown, stable, and minimum phase plants. A $PI^\alpha$ controller may be designed to ensure that the phase Bode plot is flat, i.e., that a phase derivative with respect to the frequency is zero, at a given gain crossover frequency so that the closed-loop system is robust to gain variations, and the step responses exhibit an iso-damping property. Several relay feedback "probing" tests can be used to identify the plant gain and phase at the given frequency in an iterative fashion. The identified plant gain and phase at the desired tangent frequency are used to estimate the derivatives of amplitude and phase of the plant with respect to frequency at the same frequency point by Bode's integral relationship. Then, these derivatives are used to design a $PI^\alpha$ controller for slope adjustment of the Nyquist plot to achieve the robustness of the system to gain variations. No plant model is assumed during the $PI^\alpha$ controller design. Only several relay tests are needed to be performed to develop the $PI^\alpha$ controller.

BRIEF DESCRIPTION OF THE DRAWINGS

In order that the manner in which the above-recited and other advantages and objects of the disclosure are obtained and be readily understood, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIGS. 17(a) and 17(b) are Bode plots comparing the flat phase regions for plants with and without an integrator for lower frequencies.

FIGS. 18(a) and 18(b) are Bode plots comparing $S^{-0.5}$ and the discretized approximation using CFE of Tustin operator.

DETAILED DESCRIPTION

The presently preferred embodiments of the present disclosure will be best understood by reference to the drawings, wherein like parts are designated by like numerals throughout. It will be readily understood that the components of the present disclosure, as generally described and illustrated in the figures herein, could be arranged and designed in a wide variety of different configurations. Thus, the following more detailed description of the embodiments of the apparatus, system, and method of the present disclosure is not intended to limit the scope of the disclosure, as claimed, but is merely representative of presently preferred embodiments of the disclosure.

Many phenomena, such as viscoelasticity and damping, chaos, diffusion and wave propagation, reveal a better understanding of fractional-order calculus. In theory, the control systems can include both the fractional-order dynamic system to be controlled and the fractional-order controller. However, in control practice, it is more common to consider the fractional-order controller. This is due to the fact that the plant model may have already been obtained as an integer order model in the classical sense. In most cases, the objective is to apply the fractional-order control to enhance the system control performance. For example, a generalization of the proportional-integral-derivative (PID) controller, namely the $PI^\lambda D^\mu$ controller, involving an integrator of order $\lambda$ and a differentiator of order $\mu$ where $\lambda$ and $\mu$ can be real numbers, provides a better response when used for the control of complex dynamic systems. However, in general, there is no systematic way for setting the fractional-orders $\lambda$ and $\mu$.

Figure 1:
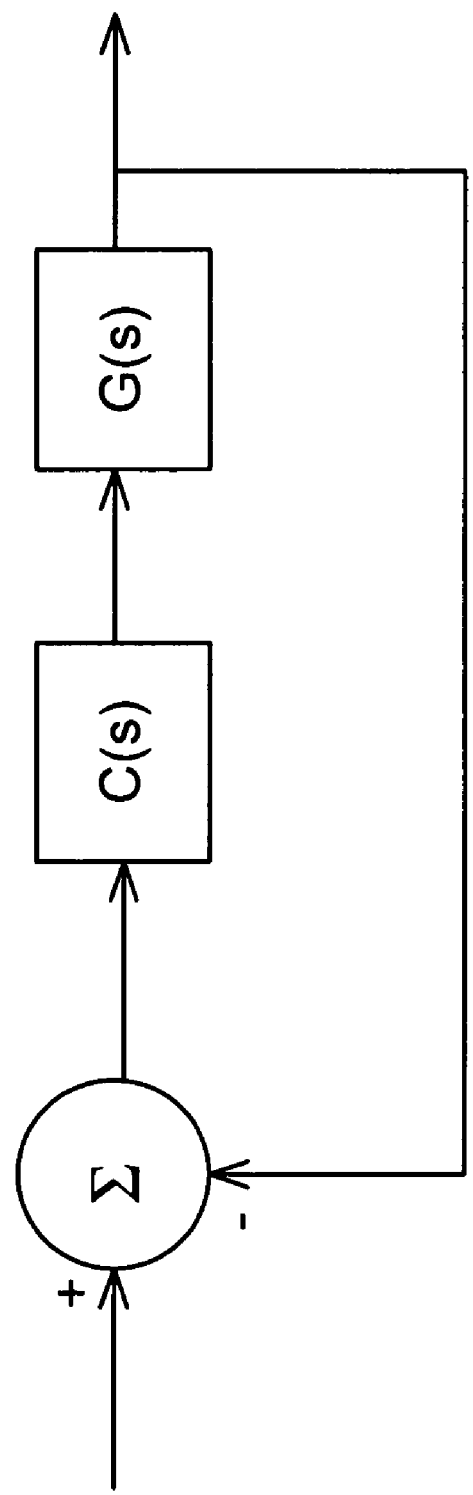
FIG. 1 is a basic system diagram of the methods disclosed herein.

FIG. 1 shows a basic system diagram 100 of the methods disclosed herein for obtaining PID controller coefficients for a closed-loop system that is robust to gain variations and for which step responses exhibit an iso-damping property. Such a PID controller C(s) may be used to tune any plant P(s) whose model is unknown, and thus whose open loop transfer function G(s) is also unknown. This PID controller C(s) likewise minimizes response errors E(s) in G(s) to a degree heretofore unachievable. A $PI^\lambda D^\mu$ controller may be expressed as $$C(s) = K_p + \frac{K_i}{s^\lambda} + K_d s^\mu,$$

which requires choosing, calculating, or estimating the following variables: $K_p$, $K_i$, $K_d$, $\lambda$, and $\mu$. This is not a trivial task and is why the following methods have been formulated. Note that $\lambda$ may variably be referred to herein as $\alpha$. Note that in many practical applications, a fractional-order proportional-integral ($PI^\alpha$) controller may suffice.

A $PI^\alpha$ controller is given as $$C(s) = K_p\left(1 + K_i \frac{1}{s^\alpha}\right), \quad (1)$$

where $\alpha$ is a real number and $\alpha \in (0, 2)$. For the systematic design of $\alpha$, a new tuning condition, called "flat phase," is used which can give a relationship between $K_i$ and $\alpha$. Specifically, in addition to the gain and phase margin specifications, an additional condition is added to the phase Bode plot at a specified frequency $w_c$ where the sensitivity circle tangentially touches the Nyquist curve and is locally flat. When achieved, this new condition provides a more robust controller to gain variations. This additional condition can be expressed as $$\left.\frac{d \angle G(s)}{ds}\right|_{s=jw_c} = 0$$

with its equivalent expression given as the following:

$$\angle \frac{dG(s)}{ds}\bigg|_{s=jw_c} = \angle G(s)|_{s=jw_c}, \quad (2)$$

where $w_c$ is the frequency at the point of tangency where the sensitivity circle tangentially touches the Nyquist curve. In (2), $$G(s) = C(s)P(s) \quad (3)$$

is the transfer function of the open loop system including the controller C(s) and the plant P(s).

An initial impression of (2) may appear like (2) is complicated to solve because the derivative of the phase of the system at $w_c$ has to be known. Fortunately, Bode's integrals can be used to approximate the derivatives of the amplitude and the phase of a system with respect to frequency, at a given frequency. To obtain the approximate derivatives, one may use measured values of the amplitude and the phase of the system at the given frequency, together with the static gain of the system.

In practice, $w_c$ can be set as the gain crossover frequency. To ensure the flat phase condition (2), the parameters $K_p$, $K_i$, and $\alpha$ of the controller C(s) are retrieved. Then, $K_p$ is adjusted to ensure that the sensitivity circle exactly tangentially touches the Nyquist curve on the flat phase. The relationship between $K_i$ and $\alpha$ is derived to ensure that the slope of the Nyquist curve is equal to the phase of the open loop system at a given frequency. The fractional-order $\alpha$ is solved by approximation.

Attention is now made to the relationship between $K_i$ and $\alpha$ under the new condition (2). First, substitute s by jw in open loop system (3) so that the open loop system can be written as G(jw)=C(jw)P(jw), where $$C(jw) = K_p\left(1 + K_i \frac{1}{(jw)^\alpha}\right) = K_p\left[\left(1 + \frac{K_i}{w^\alpha}\cos\frac{\alpha\pi}{2}\right) - j\frac{K_i}{w^\alpha}\sin\frac{\alpha\pi}{2}\right] \quad (4)$$

is the $PI^\alpha$ controller obtained from (1). The phase of the open loop system is given by $$\angle G(jw) = \angle C(jw) + \angle P(jw) \quad (5)$$

$$= \phi_0 + \tan^{-1}\left[\frac{w^{\alpha+1}\sin\frac{(\alpha+1)\pi}{2} + K_i w}{w^{\alpha+1}\cos\frac{(\alpha+1)\pi}{2}}\right] - \frac{(\alpha+1)\pi}{2}.$$

where $\phi_0 = \angle P(jw)$. Then, the derivative of the open loop system G(jw) with respect to w can be written as follows:

$$\frac{dG(jw)}{dw} = P(jw)\frac{dC(jw)}{dw} + C(jw)\frac{dP(jw)}{dw}. \quad (6)$$

From (2), the phase of the derivative of the open loop system should be known in advance which obviously cannot be obtained directly from (6). Therefore, (6) needs simplification.

In considering (6), the PI$^\alpha$ controller C(jw) is given by (4) whose derivative with respect to w is:

$$\frac{dC(jw)}{dw} = -\frac{j\alpha K_p K_i}{(jw)^{\alpha+1}}. \quad (7)$$

The calculation of $$\frac{dP(jw)}{dw},$$

may be written as follows:

$$\ln P(jw) = \ln|P(jw)| + j\angle P(jw). \quad (8)$$

Differentiating (8) with respect to w gives:

$$\frac{d\ln P(jw)}{dw} = \frac{1}{P(jw)}\frac{dP(jw)}{dw} = \frac{d\ln|P(jw)|}{dw} + j\frac{d\angle P(jw)}{dw}. \quad (9)$$

Straightforwardly, one arrives at:

$$\frac{dP(jw)}{dw} = P(jw)\left[\frac{d\ln|P(jw)|}{dw} + j\frac{d\angle P(jw)}{dw}\right]. \quad (10)$$

Substituting (4), (7) and (10) into (6) gives:

$$\frac{dG(jw)}{dw} = K_p P(jw)\left[\left(1 + \frac{K_i}{(jw)^\alpha}\right)\left(\frac{s_\alpha}{w} + j\frac{s_p}{w}\right) - \frac{j\alpha K_i}{(jw)^{\alpha+1}}\right], \quad (11)$$

where $s_\alpha(w)$ and $s_p(w)$ are defined, respectively, as follows:

$$s_\alpha(w) = w\frac{d\ln|P(jw)|}{dw}, \quad (12)$$

$$s_p(w) = w\frac{d\angle P(jw)}{dw}. \quad (13)$$

Hence, the slope of the Nyquist curve at any specific frequency w is given by $$\angle\frac{dG(jw)}{dw} = \phi_0 - \frac{(\alpha+1)\pi}{2} + \tan^{-1}\left[\frac{s_\alpha w^\alpha \sin\frac{(\alpha+1)\pi}{2} + s_\alpha K_i + s_p w^\alpha \cos\frac{(\alpha+1)\pi}{2} - \alpha K_i}{s_\alpha w^\alpha \cos\frac{(\alpha+1)\pi}{2} - s_p w^\alpha \sin\frac{(\alpha+1)\pi}{2} - s_p K_i}\right]. \quad (14)$$

Following condition (2), one obtains the relationship between $K_i$ and $\alpha$ as follows:

$$K_i = \frac{w^\alpha}{2s_p}\left[\alpha\cos\frac{(\alpha+1)\pi}{2} - 2s_p\sin\frac{(\alpha+1)\pi}{2} + \sqrt{\Delta}\right], \quad (15)$$

where $\Delta = \alpha^2\cos^2\frac{(\alpha+1)\pi}{2} -$

-continued $$4\alpha s_p \cos\frac{(\alpha+1)\pi}{2}\sin\frac{(\alpha+1)\pi}{2} + 4s_p^2\sin^2\frac{(\alpha+1)\pi}{2} - 4s_p^2.$$

Due to the nature of the quadratic equation, an alternative relationship, i.e., $$K_i = \frac{w^\alpha}{2s_p}\left[\alpha\cos\frac{(\alpha+1)\pi}{2} - 2s_p\sin\frac{(\alpha+1)\pi}{2} - \sqrt{\Delta}\right],$$

has been discarded. Also noted is that in (15) only $s_p$ is presented. Accordingly, there is no need to compute $S_\alpha$.

The approximation of $s_p$ can be given as:

$$s_p(w_0) = w_0\frac{d\angle P(jw)}{dw}\bigg|_{w_0} \quad (16)$$

$$\approx \angle P(jw_0) + \frac{2}{\pi}[\ln|K_g| - \ln|P(jw_0)|],$$

where $|K_g|=P(0)$ is the static gain of the plant, $\angle P(jw_0)$ is the phase, and $|P(jw_0)|$ is the gain of the plant at the specific frequency $w_0$. For the systems containing an integrator, $s_p$ should be estimated by using the partial model of the system without the integrator; this is because the phase of the integrator is constant, and its derivative is zero. Note that the pure time delay has no effect on the estimation of $s_p$. For most of the plants, $s_p$ can be selected between −3 and 0. In general, $s_p$ depends on the system dynamics and the frequency at which the simulations or experiments are performed. However, from (15), one notices that $\Delta$ cannot be negative so as to ensure that $K_i$ is a real number. Therefore, for each $s_p$, $\alpha$ must be limited within a more restricted interval.

Figure 2:
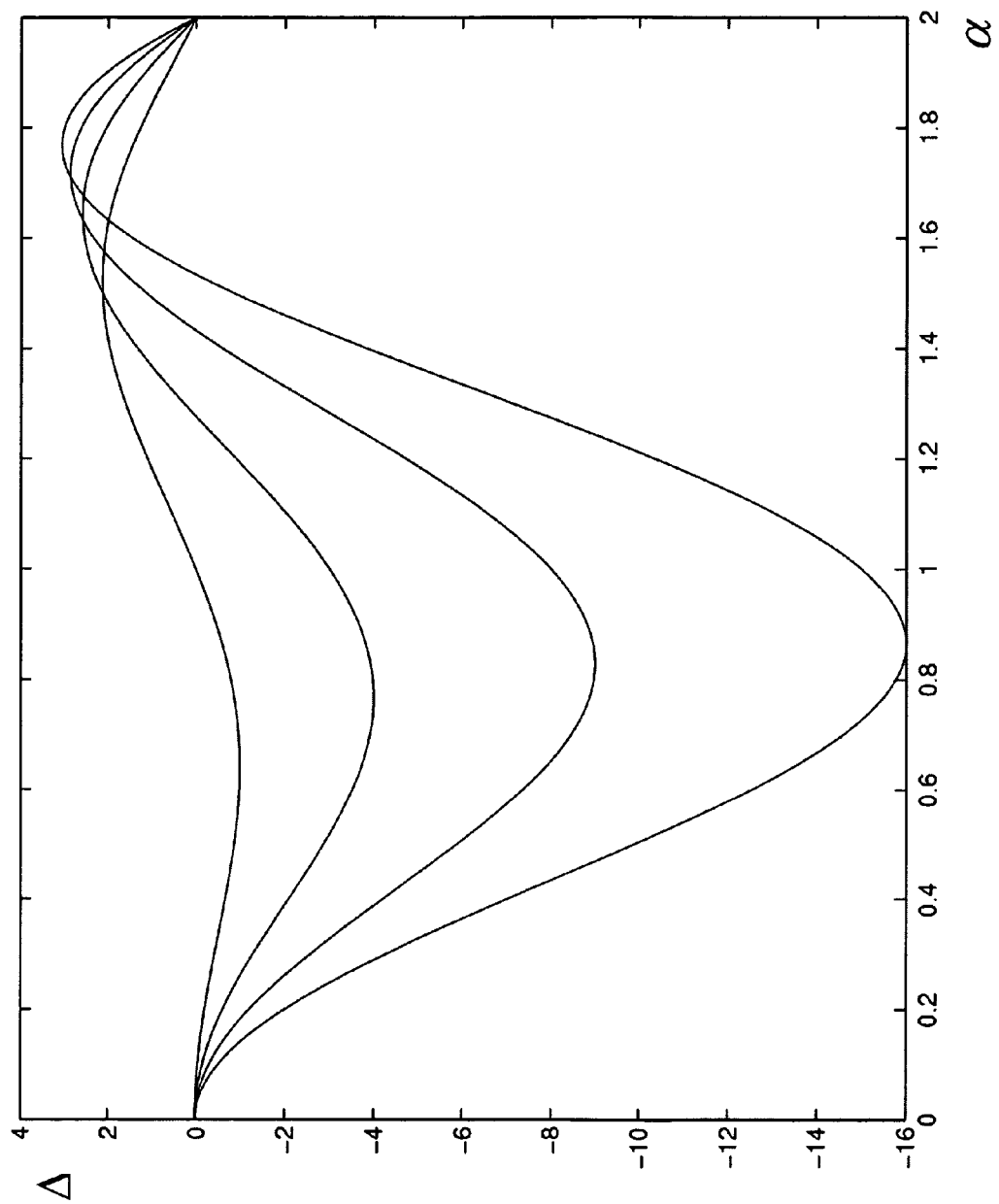
FIG. 2 is a plot of $\Delta$ versus $\alpha$.

In FIG. 2, it is shown that for different $s_p$ (−0.5, −1, −1.5, and −2) there exists an $\alpha_{zero}$, such that, when $\alpha > \alpha_{zero}$, then $\Delta > 0$. Clearly, there exists a relationship between $\alpha_{zero}$ and $s_p$. Using least squares (LS) fitting techniques, $\alpha_{zero}(s_p)$ can be approximately expressed by $$\alpha_{zero} = \frac{2.0093s_p^2 - 0.5211s_p + 0.0035}{s_p^2 - 0.9359s_p + 0.0474}. \quad (17)$$

Figure 3:
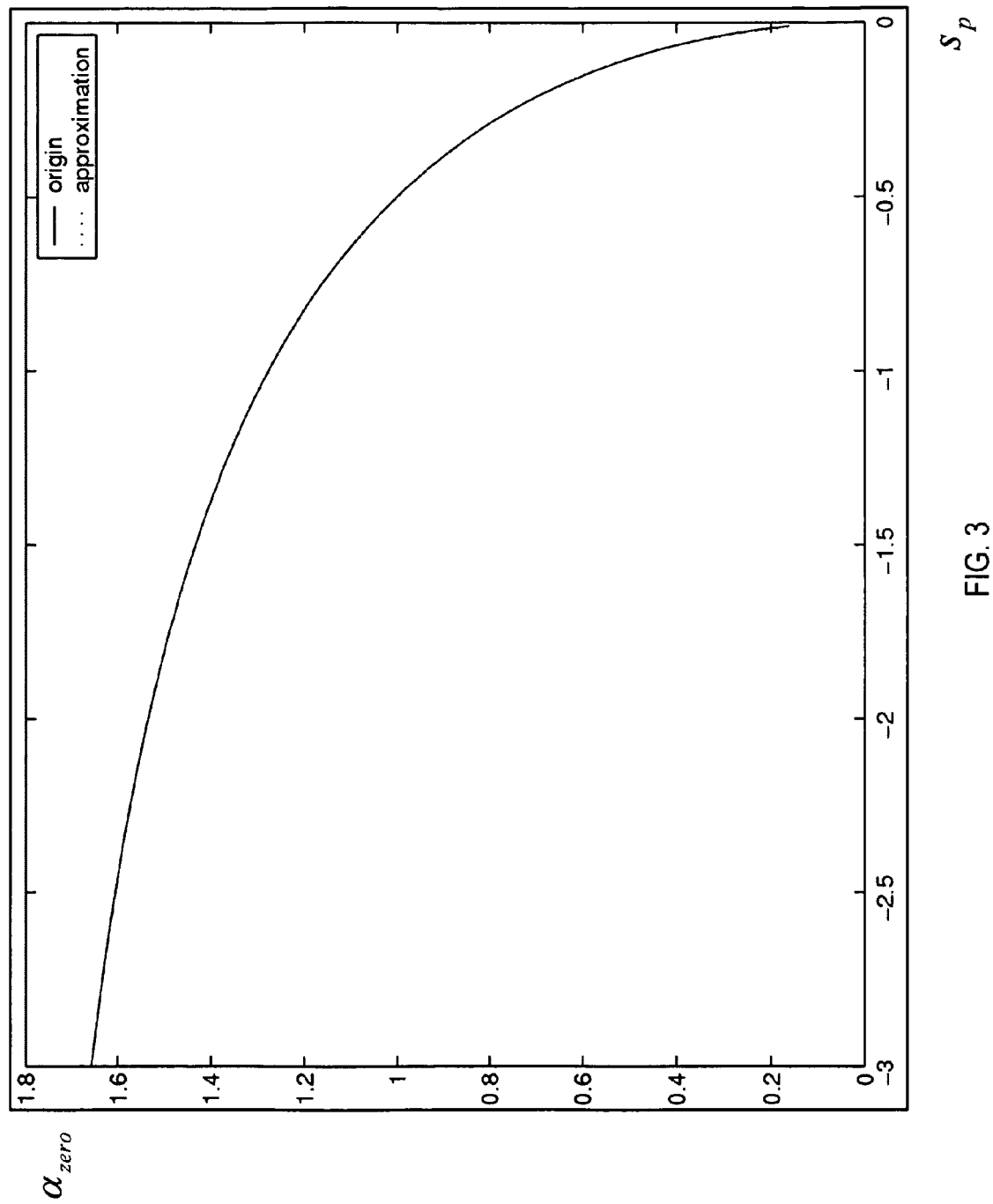
FIG. 3 is a comparison of $\alpha$, $s_p$, and $\alpha_{zero}(s_p)$.

FIG. 3 shows that the accuracy of the approximate function (17) to the actual $\alpha_{zero}$ and $s_p$ relationship is practically acceptable.

Of the parameters $K_p$, $K_i$, and $\alpha$ for the PI$^\alpha$ controller, $K_i$ is already established in the relationship (15). However, relationships for $K_p$ and $\alpha$ are required. Assuming that the phase of the open loop system at the gain crossover frequency $w_c$ is:

$$\angle G(s)|_{s=jw_c} = \phi_0 + \tan^{-1}\left[\frac{w_c^{\alpha+1}\sin\frac{(\alpha+1)\pi}{2} + K_i w_c}{w_c^{\alpha+1}\cos\frac{(\alpha+1)\pi}{2}}\right] - \frac{(\alpha+1)\pi}{2}, \quad (18)$$

than the corresponding gain is:

$$|G(jw_c)| = K_p|P(jw_c)|\sqrt{\left(1 + \frac{K_i}{w_c^\alpha}\cos\frac{\alpha\pi}{2}\right)^2 + \left(\frac{K_i}{w_c^\alpha}\sin\frac{\alpha\pi}{2}\right)^2} \quad (19)$$

$$= 1.$$

$\Phi_M$ is denoted as the desired phase margin, i.e., $\angle G(s)|_{s=jw_c} = \Phi_m - \pi$. Straightforwardly, we have:

$$\Phi_{controller} = \Phi_m - \pi - \Phi_0 \quad (20)$$

$$= \tan^{-1}\left[\frac{w_c^{\alpha+1}\sin\frac{(\alpha+1)\pi}{2} + K_i W_c}{w_c^{\alpha+1}\cos\frac{(\alpha+1)\pi}{2}}\right] - \frac{(\alpha+1)\pi}{2}.$$

It is complex to solve (20) together with (15) to get $\alpha$, $K_p$, and $K_i$. However, observe that by substituting (15) into (20), $\Phi_{controller}$ is the function only of $s_p$ and $\alpha$, not explicitly of w any more. The LS fitting may be used again to approximate the function in (20). The following form of approximation may be used:

$$\Phi_{controller} \approx \frac{A(s_p)\alpha^2 + B(s_p)\alpha + C(s_p)}{\alpha^2 + D(s_p)\alpha + E(s_p)}, \alpha \in (\alpha_{zero}(s_p), 2), \quad (21)$$

where $A(s_p)$, $B(s_p)$, $C(s_p)$, $D(s_p)$ and $E(s_p)$ are polynomial functions of $s_p$. The fitting results are summarized below for completeness:

$A(s_p) = -0.00652s_p^7 - 0.07259s_p^6 - 0.32682s_p^5 - 0.7568s_p^4 - 0.92446s_p^3 - 0.44551s_p^2 + 0.19469s_p + 0.00283,$ $B(s_p) = 0.0273s_p^7 + 0.30814s_p^6 + 1.41817s_p^5 + 3.42016s_p^4 + 4.57371s_p^3 + 3.04877s_p^2 + 0.30284s_p - 0.01085,$ $C(s_p) = -0.02871s_p^7 - 0.32823s_p^6 - 1.54191s_p^5 - 3.85236s_p^4 - 5.52107s_p^3 - 4.39267s_p^2 - 1.42674s_p + 0.01003,$ $D(s_p) = 0.02154s_p^7 + 0.2571s_p^6 + 1.26183s_p^5 + 3.3037s_p^4 + 5.04888s_p^3 + 4.74463s_p^2 + 3.03777s_p - 2.09475,$ $E(s_p) = -0.02433s_p^7 - 0.29619s_p^6 - 1.49144s_p^5 - 4.05076s_p^4 - 6.55861s_p^3 - 6.81121s_p^2 - 5.17001s_p + 0.10642.$ $\alpha$ can be solved from the following approximate relationship:

$$\frac{A(s_p)\alpha^2 + B(s_p)\alpha + C(s_p)}{\alpha^2 + D(s_p)\alpha + E(s_p)} = \Phi_m - \pi - \phi_0. \quad (22)$$

Clearly, given $s_p$, it is much easier to obtain $\alpha$ by solving (22) than by solving (20). For $\alpha \in (\alpha_{zero}(s_p), 2)$ and $s_p \in (-3, 0)$, the precision of the estimation is found to be acceptable via extensive numerical experiments. Additionally, the methods taught herein lend themselves well to use of numerical "tuning tables" to approximate the parameters of a PI or PID controller, whether of an integer or non-integer order. Such tables may incorporate the flat phase condition (2) discussed above, and incorporate any number of the equations presented herein that lead to close approximations for parameters $K_p$, $K_i$, $K_d$, $\alpha$, and $\mu$ of controller $$C(s) = K_p + \frac{K_i}{s^\alpha} + K_d s^\mu.$$

These tables may be implemented in spreadsheet or database format, as are known in the art.

Following the above formulation, the parameters of a PID controller can be calculated straightforwardly if one knows $\angle P(jw_c)$, $|P(jw_c)|$ and $s_p(w_c)$. As indicated in (16), $s_p(w_c)$ can be obtained from the knowledge of the static gain $|P(0)|$, $\angle P(jw_c)$, and $|P(jw_c)|$. The static gain $|P(0)|$ or $K_g$ is very easy to measure, and it is assumed to be known. As mentioned, the values for $\angle P(jw_c)$ and $|P(jw_c)|$ may be measured through iterative relay feedback tests.

In the relay feedback experiments, a relay is connected in closed-loop with the unknown plant $P(s)$, which is usually to identify one point on the Nyquist diagram of the plant. To change the oscillation frequency due to relay feedback, an artificial time delay $\theta$ is introduced in the loop, expressed as $e^{-\theta s}$. The artificial time delay $\theta$ is the tuning knob used to change the oscillation frequency. The challenge is to get the right value of $\theta$ that corresponds to the tangent frequency $w_c$. To solve this, the following tuning method may be used.

First, start with the desired tangent frequency $w_c$. Next, select two different values ($\theta_{-1}$ and $\theta_0$) for the time delay parameter properly and do the relay feedback test twice. Then, two points on the Nyquist curve of the plant can be obtained. The frequencies of these points can be represented as $w_{-1}$ and $w_0$ that correspond to $\theta_{-1}$ and $\theta_0$, respectively. Iterations begin with these initial values: $(\theta_{-1}, w_{-1})$ and $(\theta_0, w_0)$.

Finally, the artificial time delay $\theta$ can be updated using a simple interpolation (or extrapolation) scheme as follows:

$$\theta_n = \frac{w_c - w_{n-1}}{w_{n-1} - w_{n-2}}(\theta_{n-1} - \theta_{n-2}) + \theta_{n-1}$$

where n represents the current iteration number. With the new $\theta_n$, after the relay test, the corresponding frequency $w_c$ may be recorded. Compare $w_n$ with $w_c$. If $|w_n - w| < \delta$, then quit the iteration(s). Here, $\delta$ is a small positive number. After the iternation(s), the final oscillation frequency is quite close to the desired one ($w_c$), so that the oscillation frequency is considered to be $w_c$. Hence, the amplitude $|P(jw_c)|$ and phase $\angle P(jw_c)$ of the plant $P(s)$ at the specified frequency can be obtained. Further discussion of the iterative relay feedback test discussed here may be found at Y. Q. Chen, C. H. Hu, and K. L. Moore, "Relay feedback tuning of robust PID controllers with iso-damping property," in *Proceedings of the 42nd IEEE Conference on Decision and Control*, Hawaii, 2003, which is herein incorporated by reference.

The methodology to determine the $PI^\alpha$ controller parameters are briefly summarized as follows:

i) given $w_c$, the gain crossover frequency;
ii) given $\Phi_m$, the desired phase margin;
iii) from the real plant, obtain the measurements of $\angle P(jw_c)$ and $|P(jw_c)|$ using iterative relay feedback tests, such as those just discussed above;
iv) calculate an estimation of $s_p(w_c)$ according to (16);
v) compute $\alpha$ and $K_i$ from (22) and (15), respectively; and
vi) obtain $K_p$ from (19).

Due to the constraint in $\alpha_{zero}(s_p)$, $w_c$ should not be chosen too aggressively. As usual, $\Phi_m$ should be selected from 30° to 60°. The PI$^\alpha$ controller design method presented above is illustrated via simulation examples. In simulations, the following plants may be used.

$$P_n(s) = \frac{1}{(s+1)^{(n+3)}}, n = 1, 2, 3, 4; \quad (23)$$

$$P_5(s) = \frac{1}{s(s+1)^3}; \quad (24)$$

$$P_6(s) = \frac{1}{(s+1)^3}e^{-s}; \quad (25)$$

$$P_7(s) = \frac{1}{s(s+1)^3}e^{-s}; \quad (26)$$

$$P_8(s) = \frac{1}{(s+1)}e^{-s}. \quad (27)$$

Consider the following fifth order plant first, i.e., $P_2(s)$. The specifications are set as $w_c$=0.295 rad./sec. and $\Phi_m$=45°. The PI$^\alpha$ controller designed by using the proposed tuning formulae is $$C_{2\alpha}(s) = 1.378\left(1 + \frac{0.168}{s^{1.383}}\right).$$

Figure 4B:
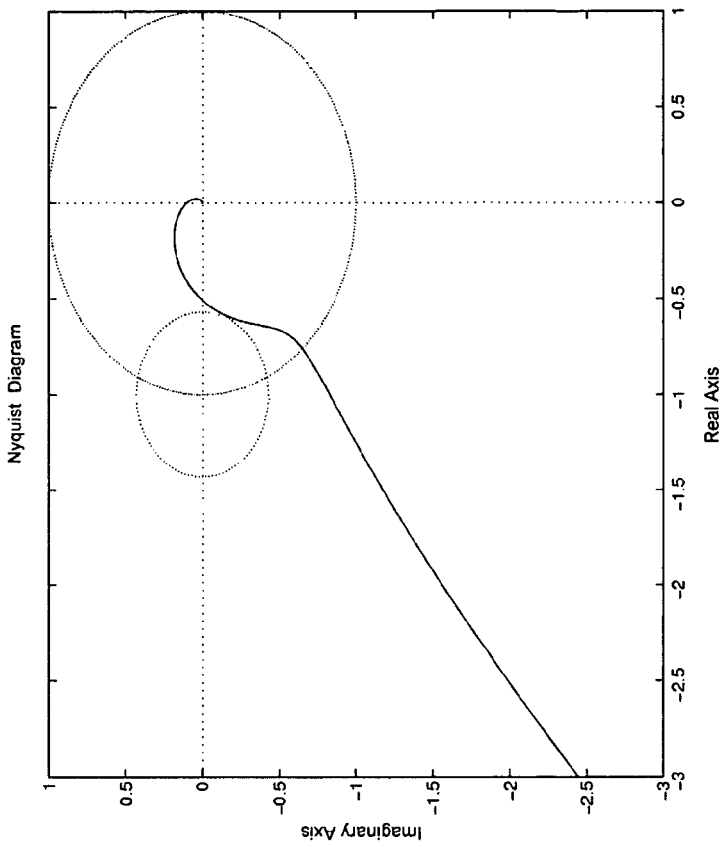
FIGS. 4(a) and 4(b) are Bode and Nyquist plots (diagrams) for $C_{2\alpha}(s)P_2(s)$.
Figure 4A:
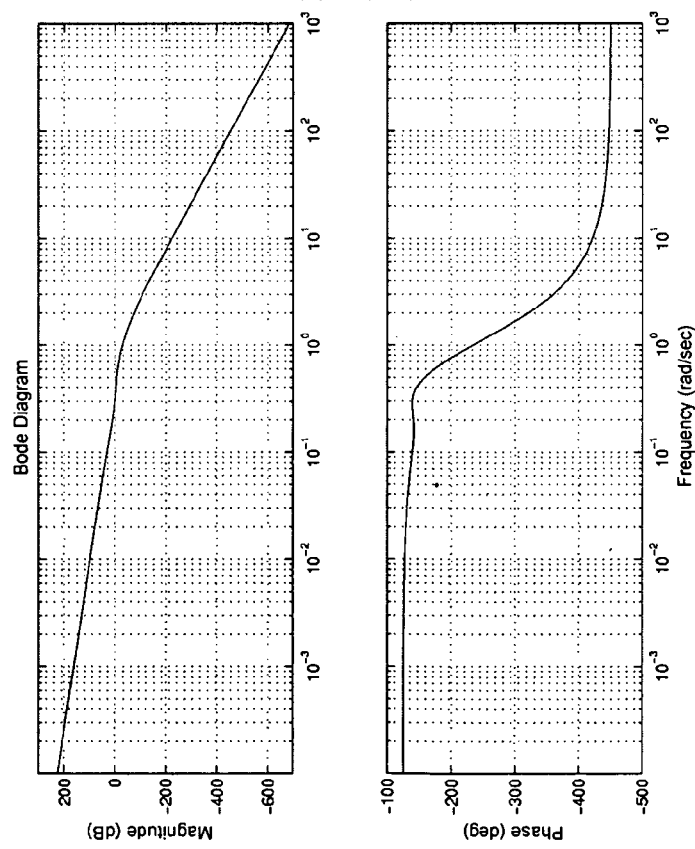

The Bode and the Nyquist plots are compared in FIGS. 4(*a*) and 4(*b*). From the Bode diagram in FIG. 4(*a*), it is seen that the phase curve near the gain crossover frequency is flat due to the proposed design method. The phase margin exactly equals 45°. That means the controller moves the point P(0.295j) of the Nyquist curve to a point of C(jw)P(jw) on the unit circle having a phase of −135° and at the same time makes the Nyquist curve match the constraint of (2). Unfortunately, from FIG. 4(*b*), the Nyquist curve of the open loop system is not tangential to the sensitivity circle at the flat phase region. But, if the open loop gain is adjusted, the gain Bode plot can be shifted to obtain a different crossover frequency. The frequency interval corresponding to the flat phase is defined as [$w_l, w_h$]. The gain crossover frequency $w_c$ can be moved in [$w_l, w_h$] by adjusting $K_p$ by $K_p' = \beta K_p$ where $\beta$ belongs to $$\left[\frac{w_l}{w_c}, \frac{w_h}{w_c}\right].$$

In this case, setting $\beta$=0.5 results in the modified proposed controller $$C'_{2\alpha}(s) = 0.689\left(1 + \frac{0.168}{s^{1.383}}\right).$$

For comparison, the PI controller designed by the modified Ziegler-Nichols method is $$C_{2mZN}(s) = 0.344\left(1 + \frac{1}{1.237s}\right).$$

Figures 5A, 5B:
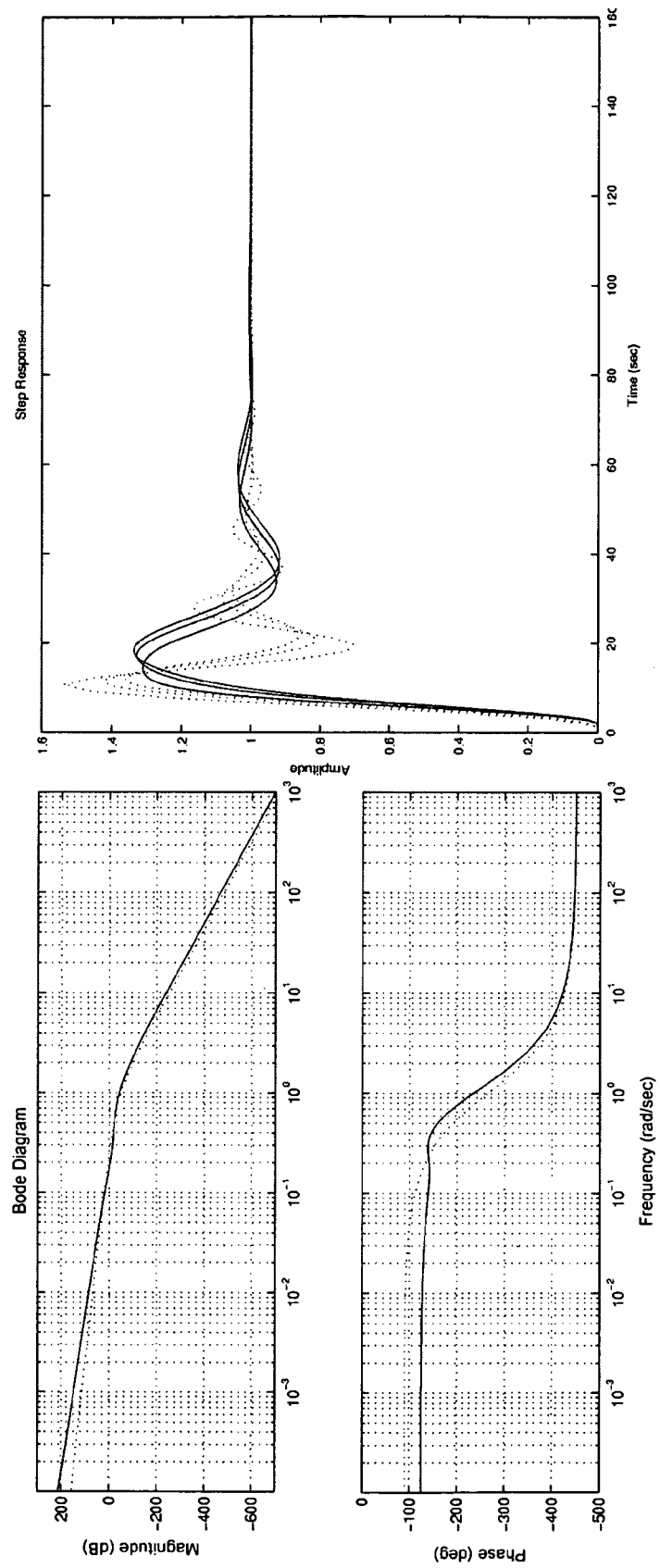
FIGS. 5(a) and 5(b) are comparisons of Bode plots and step responses.

The Bode plots are compared in FIG. 5(*a*). The dashed line is the modified Ziergler-Nichols $C_{2mZN}(S)P_2(S)$ controller. The solid line is the $C'_{2\alpha}(s)P_2(s)$ controller. The step responses of the close loop system are compared in FIG. 5(*b*). The solid line is the modified proposed controller with gain variations 1, 1.1, and 1.3. The dotted line is the modified Ziegler-Nichols controller with the same gain variations (1, 1.1, and 1.3). Comparing the closed-loop system with the proposed modified controller to that with the modified Ziegler-Nichols controller, the overshoots of the step response from the proposed scheme remain invariant under gain variations. However, the overshoots of the modified Ziegler-Nichols controller change remarkably.

In practice, the fractional-order integrator in the proposed PI$^\alpha$ controller may not be exactly achieved since it is an infinite dimensional filter. A band-limit implementation of the fractional-order integrator is important in practice, i.e., the finite-dimensional approximation of the fractional-order system should be done in a proper range of frequencies of practical interest. The approximation method used may include the Oustaloup Recursive Algorithm. In simulations, for approximation of the fractional-order integrator, the frequency range of practical interest is selected to be from 0.001 Hz to 1000 Hz. The sampling time and the number of the recursive zero-pole pairs are assigned as 0.001 sec and 13, respectively. The other plants shown in (23) have similar simulation results. The results are briefly summarized, as follows, for further illustrations.

For the fourth order plant, $$P_1(s) = \frac{1}{(s+1)^4},$$

the proposed controller is $$0.695\left(1 + \frac{0.2512}{s^{1.369}}\right)$$

with respect to $\beta$=0.5, $w_c$=0.374 rad./sec., and $\Phi_m$=45°. The controller designed by the modified Ziegler-Nichols method is $$0.062\left(1 + \frac{1}{0.22s}\right).$$

Figures 6A, 6B:
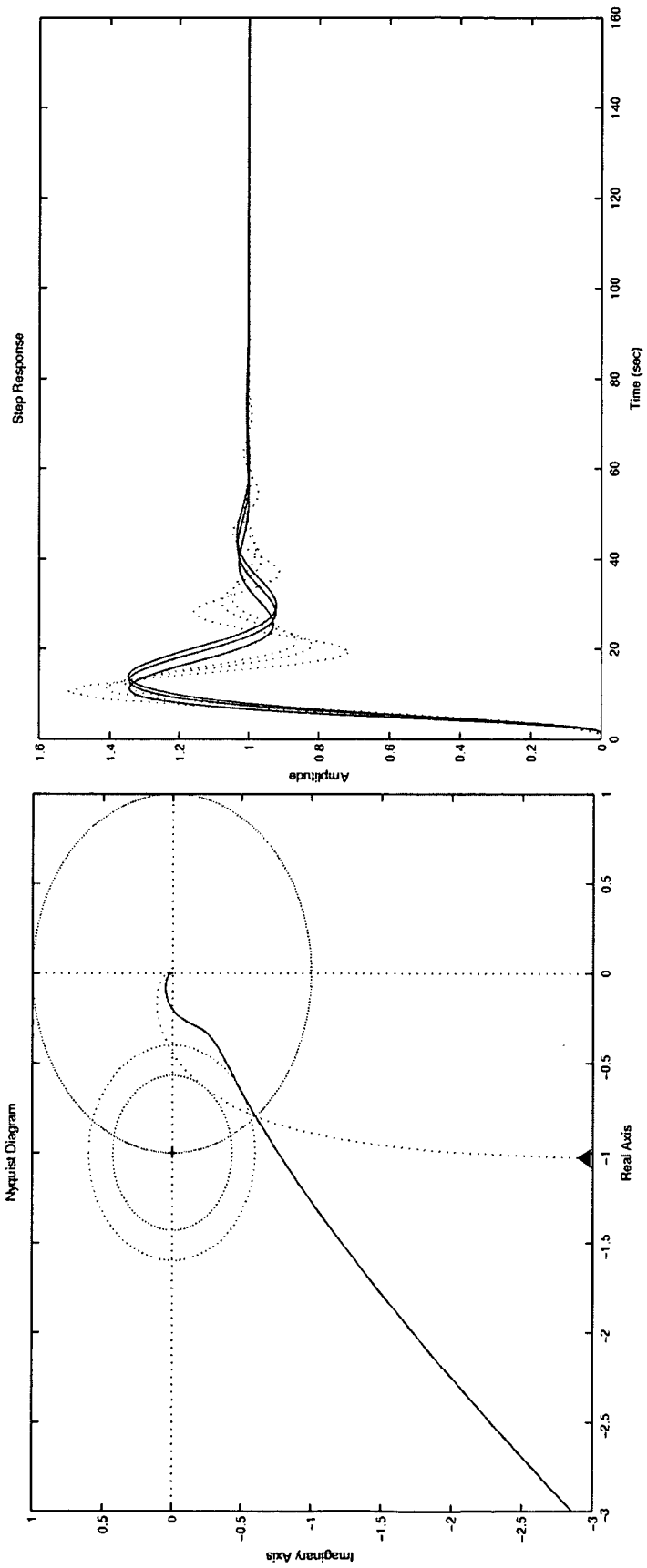
FIGS. 6(a) and 6(b) are comparisons of Nyquist plots and step responses for $P_1(s)$.

The results are summarized in FIGS. 6(*a*) and 6(*b*). FIG. 6(*a*) is a comparison Nyquist plot for $P_1(s)$, wherein the dashed line is the modified Ziegler-Nichols plot, and the solid line is the proposed controller. FIG. 6(*b*) includes comparison step responses for $P_1(s)$, wherein the solid line is the modified proposed controller with gain variations 1, 1.1, and 1.3 and the dotted line is the modified Ziegler-Nichols controller with the same gain variations.

For the sixth order plant, $$P_3(s) = \frac{1}{(s+1)^6},$$

the proposed controller is $$0.526\left(1 + \frac{0.132}{s^{1.385}}\right)$$

with respect to $\beta=0.4$, $w_c=0.242$ rad./sec., and $\Phi_m=45°$. The controller designed by the modified Ziegler-Nichols method is $$0.289\left(1 + \frac{1}{1.327s}\right).$$

Figure 7B:
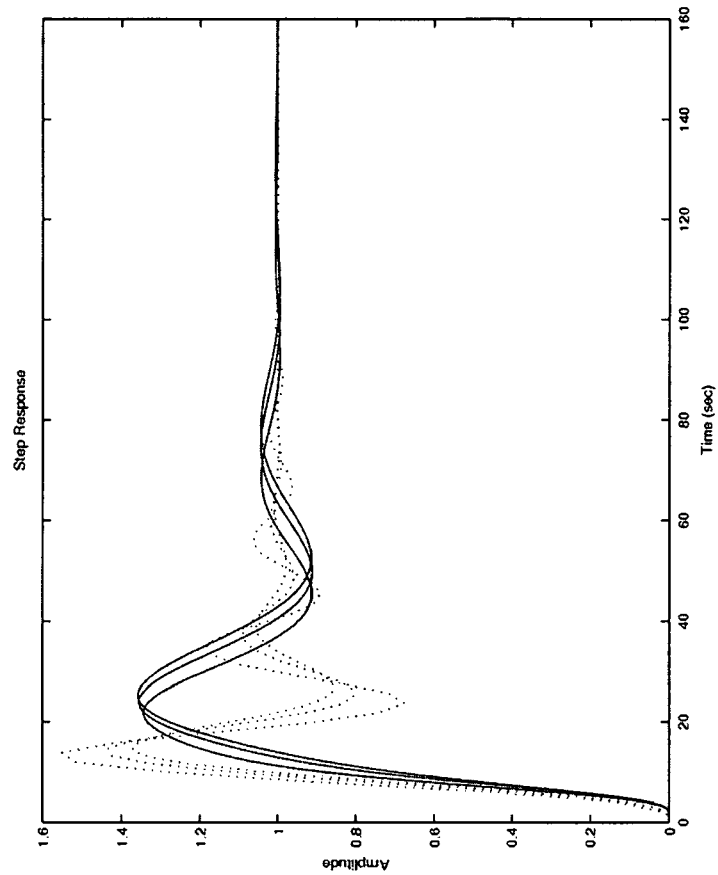
FIGS. 7(a) and 7(b) are comparisons of Nyquist plots and step responses for $P_3(s)$.
Figure 7A:
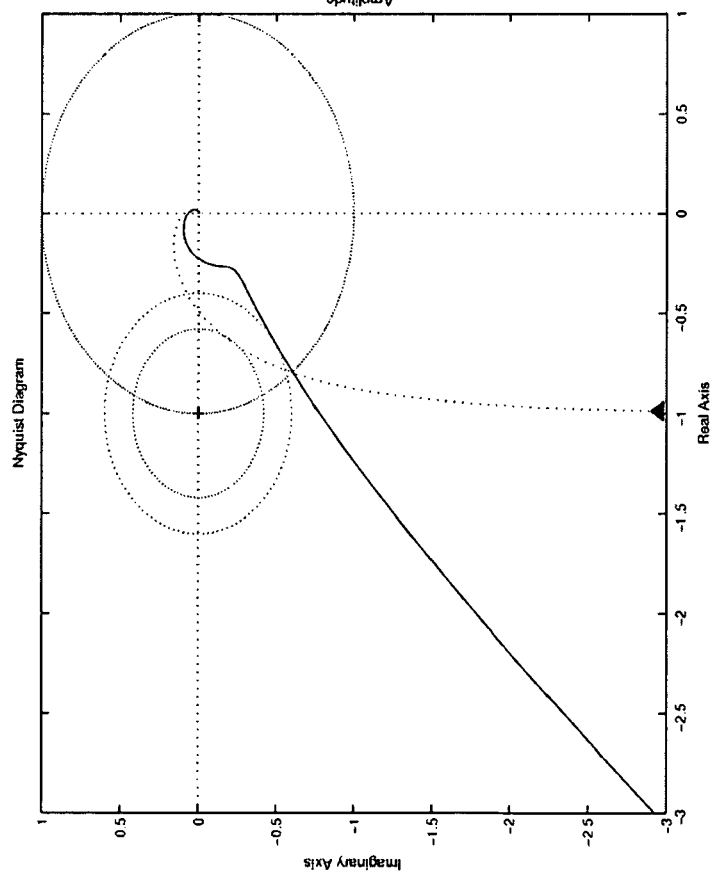

The results are summarized in FIGS. 7(*a*) and 7(*b*). FIG. 7(*a*) is a comparison Nyquist plot for P$_3$(S), wherein the dashed line is the modified Ziegler-Nichols plot, and the solid line is the proposed controller. FIG. 7(*b*) includes comparison step responses for P$_3$(S), wherein the solid line is the modified proposed controller with gain variations 1, 1.1, and 1.3, and the dotted line is the modified Ziegler-Nichols controller with the same gain variations.

For the seventh order plant, $$P_4(s) = \frac{1}{(s+1)^7},$$

the proposed controller is $$0.516\left(1 + \frac{0.105}{s^{1.389}}\right)$$

with respect to $\beta=0.4$, $w_c=0.206$ rad./sec., and $\Phi_m=45°$. The controller designed by the modified Ziegler-Nichols method is $$0.164\left(1 + \frac{1}{0.949s}\right).$$

From these general plant classes P$_n$(s), the effectiveness of the proposed PI$^\alpha$ controller is clearly demonstrated.

Figure 8B:
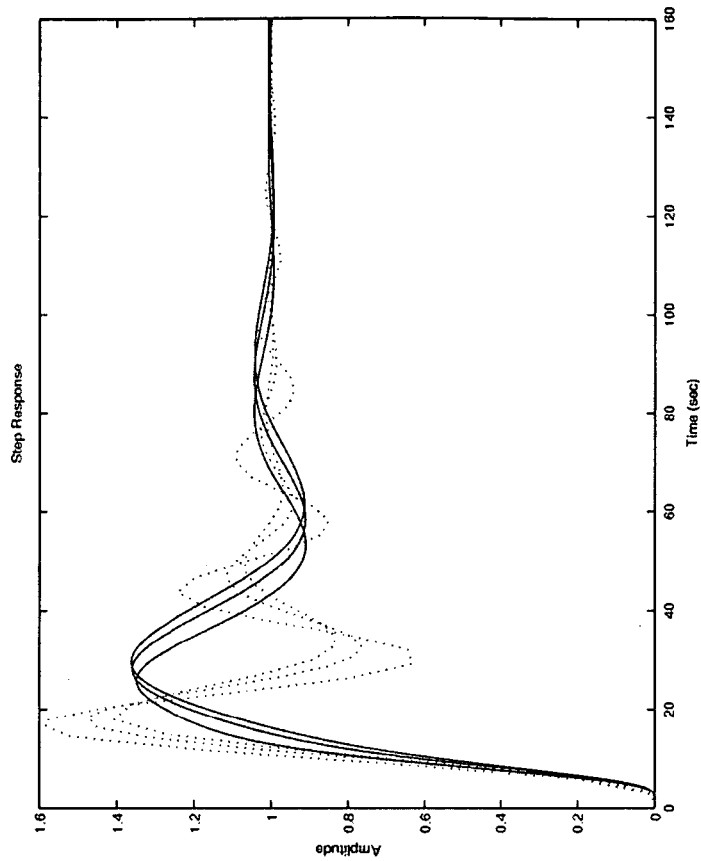
FIGS. 8(a) and 8(b) are comparisons of Nyquist plots and step responses for $P_4(s)$.
Figure 8A:
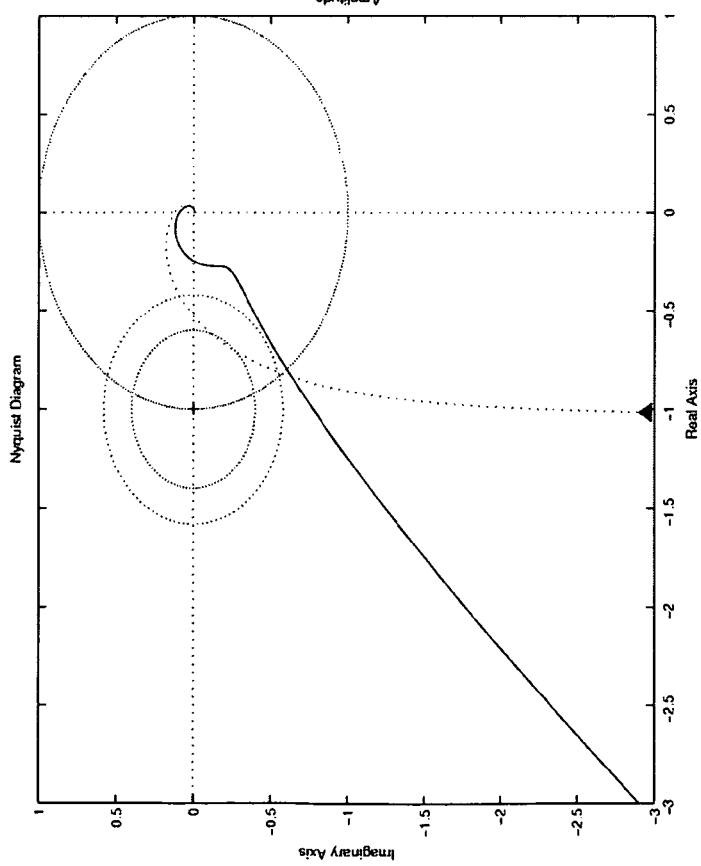

The results are summarized in FIGS. 8(*a*) and 8(*b*). FIG. 8(*a*) is a comparison Nyquist plot for P$_4$(s), wherein the dashed line is the modified Ziegler-Nichols plot, and the solid line is the proposed controller. FIG. 8(*b*) includes comparison step responses for P$_4$(S), wherein the solid line is the modified proposed controller with gain variations 1, 1.1, and 1.3, and the dotted line is the modified Ziegler-Nichols controller with the same gain variations.

For the plant with an integrator, $$P_5(s) = \frac{1}{s(s+1)^3},$$

the proposed controller is $$0.037\left(1 + \frac{0.109}{s^{0.814}}\right)$$

with respect to $\beta=0.5$, $w_c=0.1$ rad./sec., and $\Phi_m=45°$. The controller designed by the modified Ziegler-Nichols method is $$0.048\left(1 + \frac{1}{21.565s}\right).$$

Figure 9:
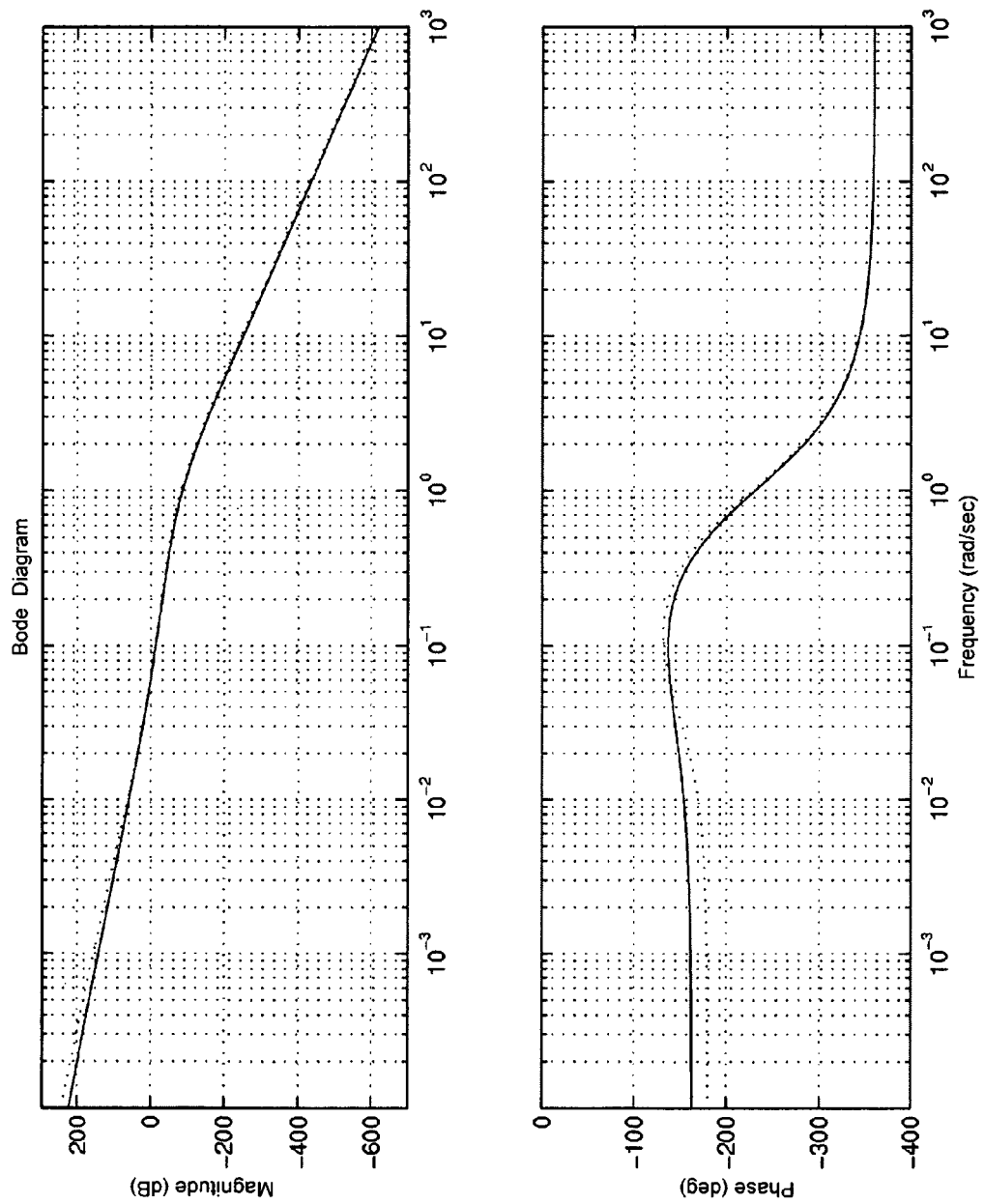
FIG. 9 includes Bode plots of $P_5(s)$.

The comparison of Bode plots, shown in FIG. 9, reveals that the two curves are very close to each other. The solid line is the proposed modified controller, and the dotted line is the modified Ziegler-Nichols controller.

Figures 10A, 10B:
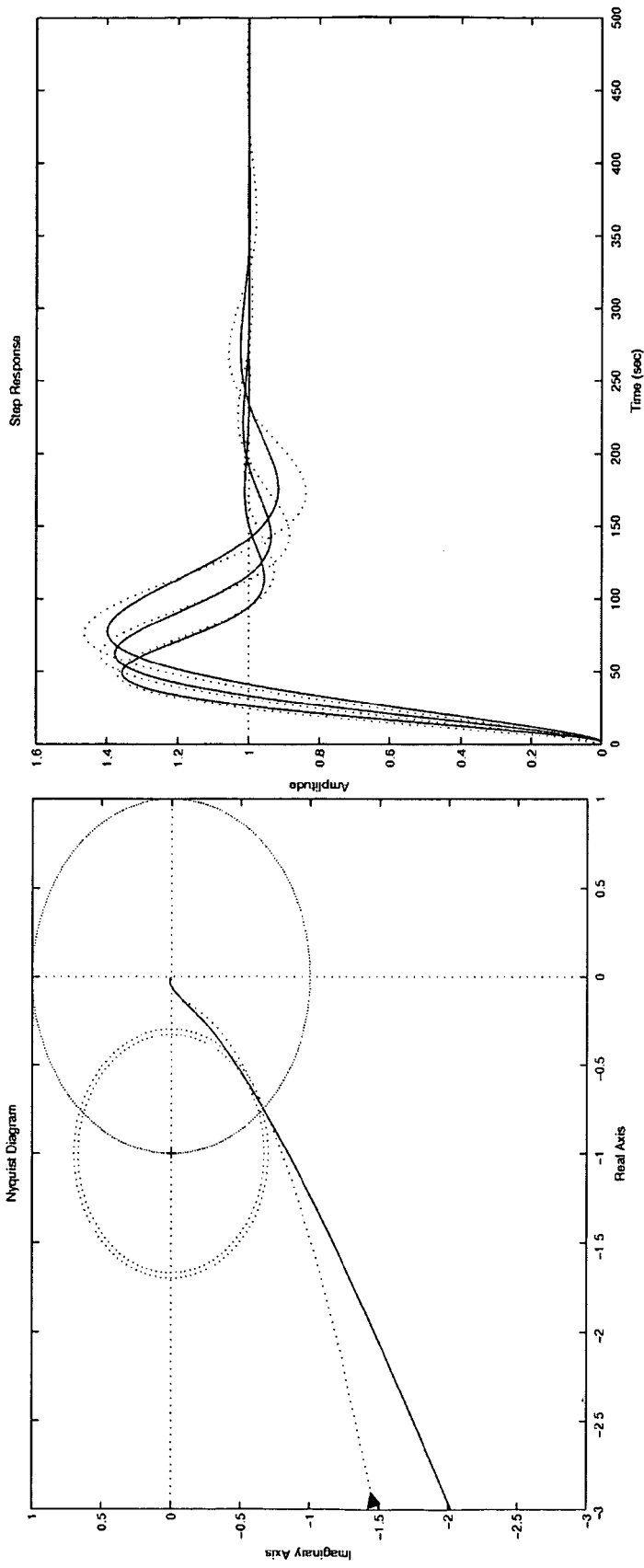
FIGS. 10(a) and 10(b) are comparisons of Nyquist plots and step responses for $P_5(s)$.

The Nyquist diagram and the step responses are shown in FIGS. 10(*a*) and 10(*b*). FIG. 10(*a*) is a comparison Nyquist plot for P$_5$(s), wherein the dashed line is the modified Ziegler-Nichols plot, and the solid line is the proposed controller. FIG. 10(*b*) includes comparison step responses for P$_5$(S), wherein the solid line is the modified proposed controller with gain variations 1, 0.7, and 0.5, and the dotted line is the modified Ziegler-Nichols controller with the same gain variations. From the step response comparison, the proposed controller does not exhibit an obviously better performance than the modified Ziegler-Nichols controller for the iso-damping property. However, as the gain of the plant decreases more than 6 dB, one can see that the overshoot of the system with the proposed controller increases much less than that of the Ziegler-Nichols controller.

For the plant with delay, $$P_6(s) = \frac{1}{(s+1)^3}e^{-s},$$

the proposed controller is $$0.532\left(1 + \frac{0.238}{s^{1.3817}}\right)$$

with respect to $\beta=0.4$, $w_c=0.368$ rad./sec., and $\Phi_m=45°$. The controller designed by the modified Ziegler-Nichols method is $$0.369\left(1 + \frac{1}{1.05s}\right).$$

Figure 11:
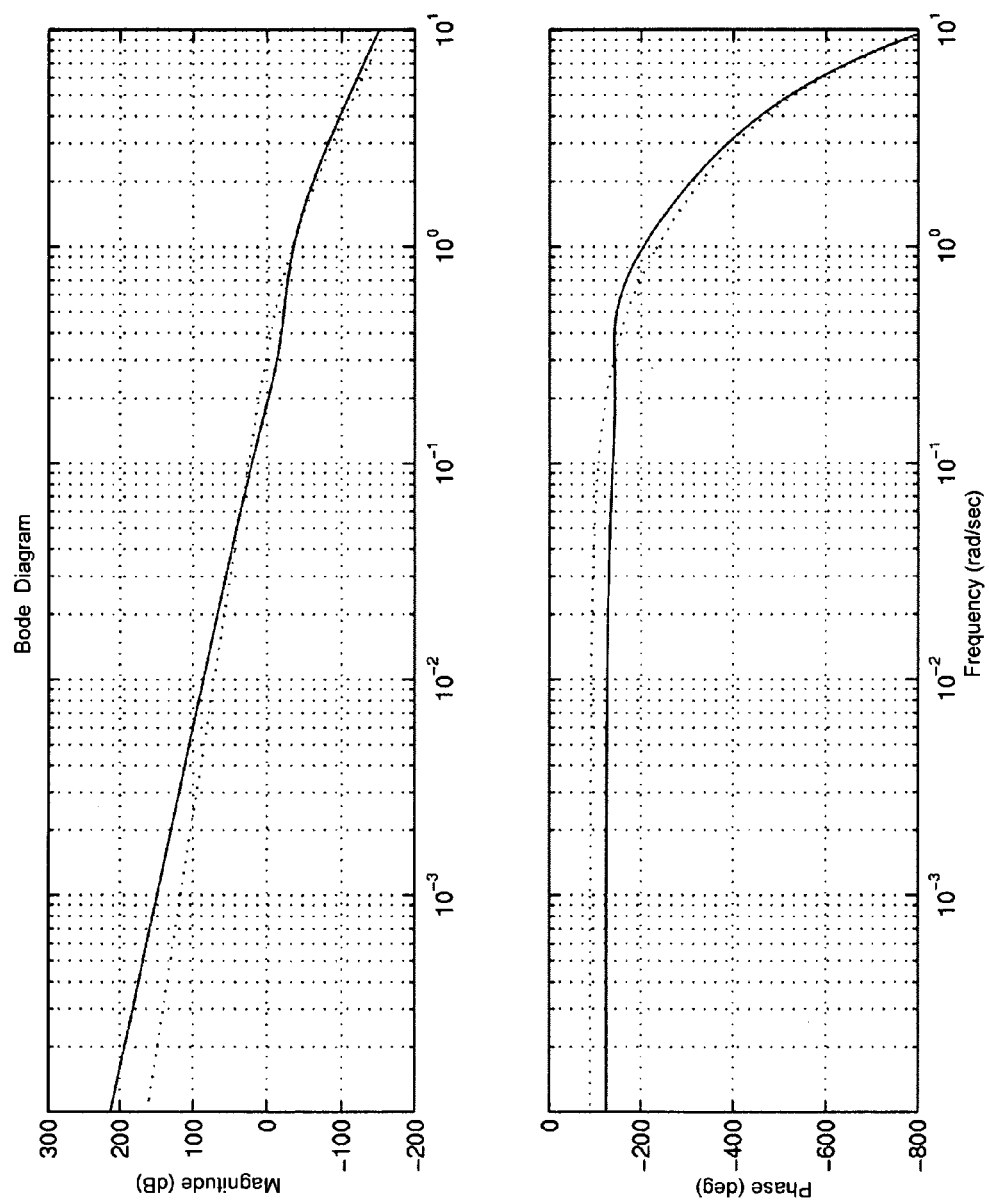
FIG. 11 includes Bode plots of $P_6(s)$.

The Bode plots are compared in FIG. 11 where the flat phase is achieved. FIG. 11 summarizes the comparisons of Nyquist plots and the step responses under different gain variations. The solid line is the proposed modified controller, while the dotted line is the modified Ziegler-Nichols controller.

Figure 12B:
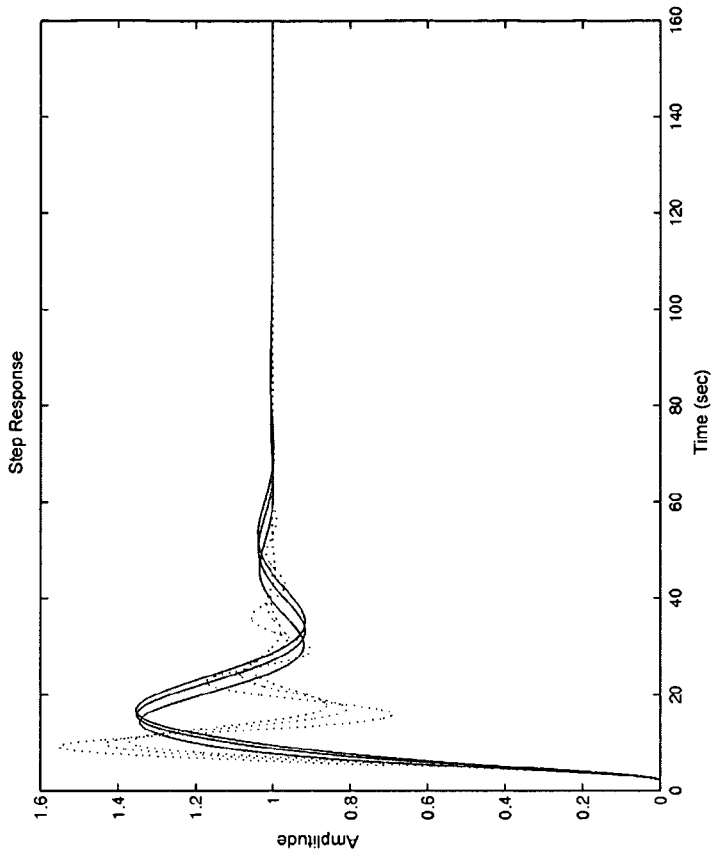
FIGS. 12(a) and 12(b) are comparisons of Nyquist plots and step responses for $P_6(s)$.
Figure 12A:
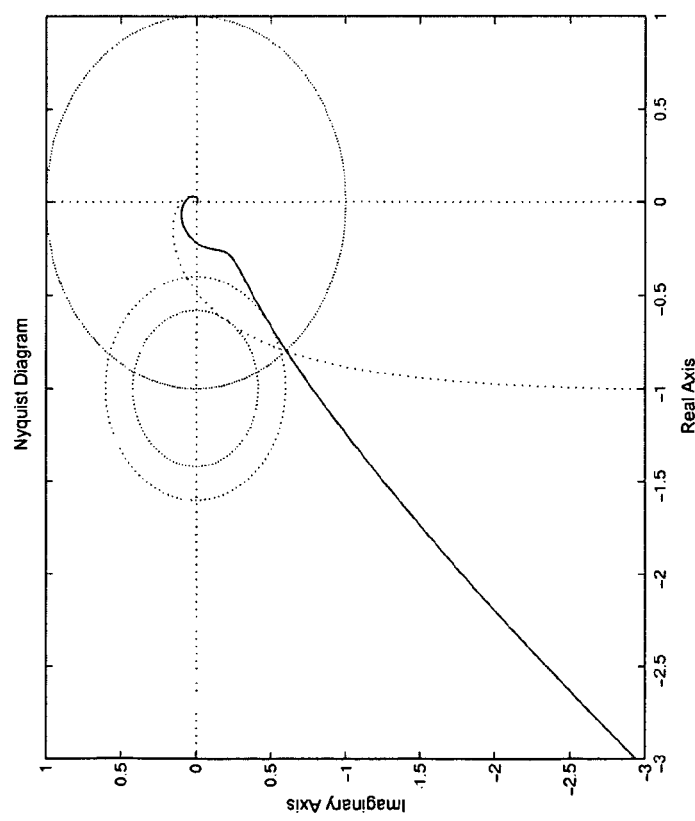

FIG. 12(*a*) is a comparison Nyquist plot for P$_6$(S), wherein the dashed line is the modified Ziegler-Nichols plot, and the solid line is the proposed controller. FIG. 12(*b*) includes comparison step responses for P$_6$(s), wherein the solid line is the modified proposed controller with gain variations 1, 1.1, and 1.3, and the dotted line is the modified Ziegler-Nichols controller with the same gain variations.

For the plant with integrator and artificial time delay $$P_7(s) = \frac{1}{s(s+1)^3} e^{-s},$$

the proposed controller is $$0.026 \left(1 + \frac{0.065}{s^{0.869}}\right)$$

with respect to $\beta=0.4$, $w_c=0.08$ rad./sec., and $\Phi_m=45°$. The controller designed by the modified Ziegler-Nichols method is $$0.031 \left(1 + \frac{1}{29.967s}\right).$$

Figure 13:
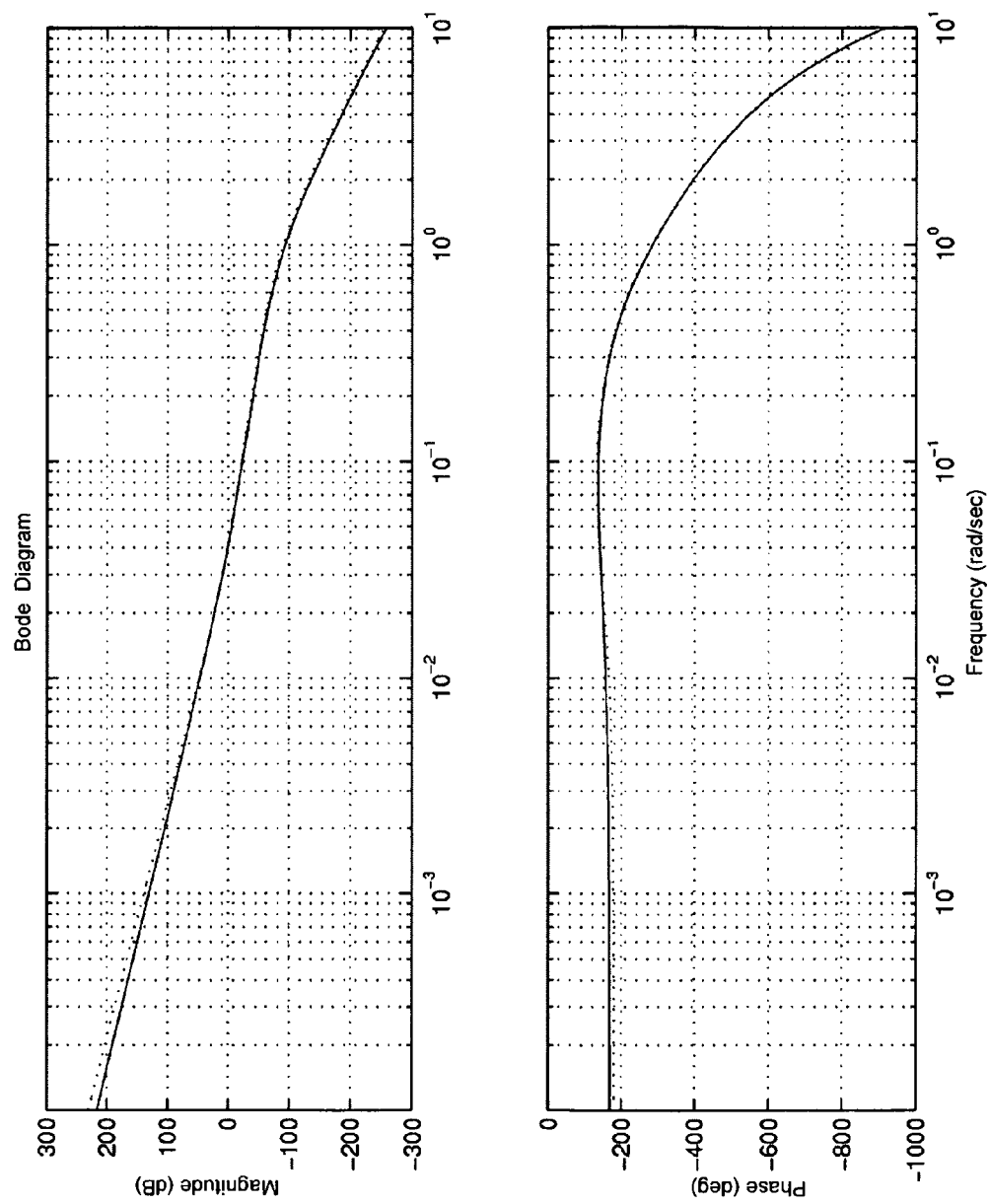
FIG. 13 includes Bode plots of $P_7(s)$.

The Bode plots for $P_7(s)$ are compared in FIG. 13 where the flat phase is again achieved. The solid line is the proposed modified controller, while the dotted line is the modified Ziegler-Nichols controller.

Figures 14A, 14B:
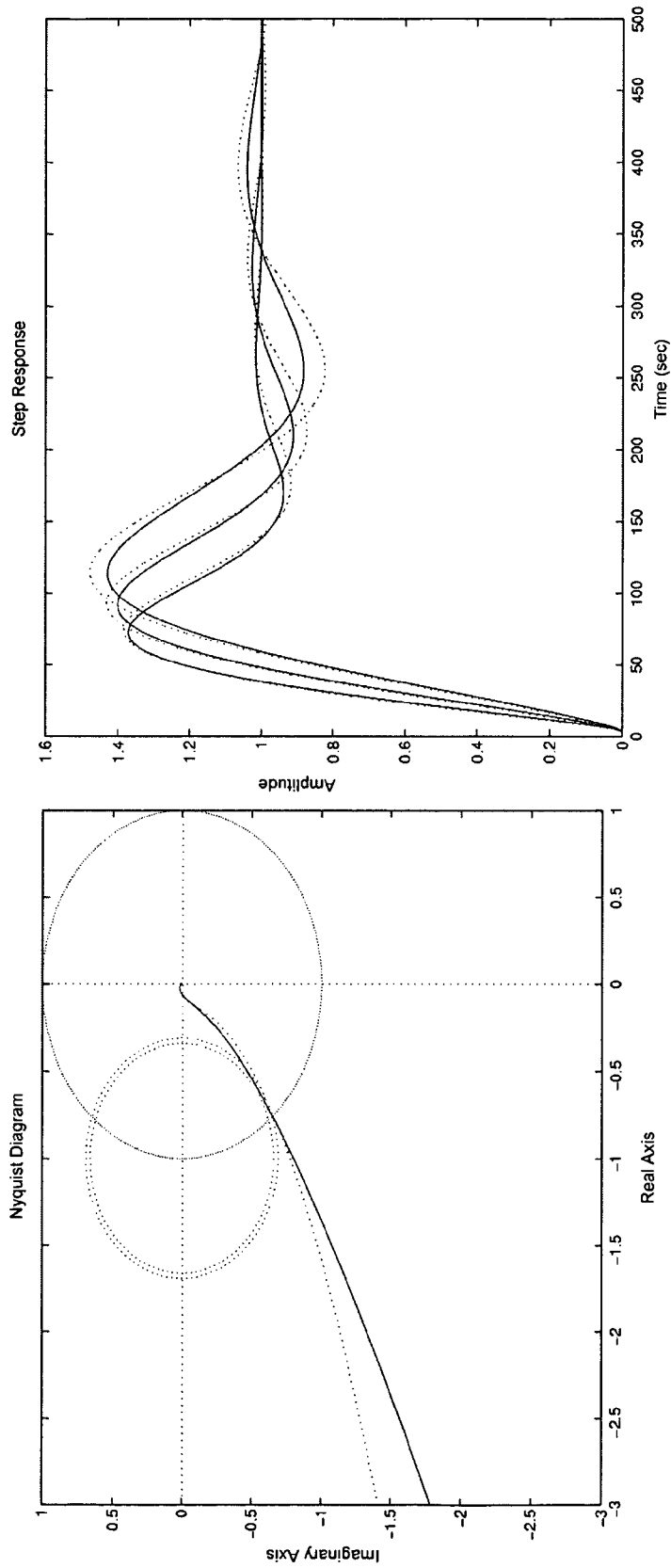
FIGS. 14(a) and 14(b) are comparisons of Nyquist plots and step responses for $P_7(s)$.

FIGS. 14(a) and 14(b) summarize the comparisons of Nyquist plots and the step responses under different gain variations for $P_7(S)$. FIG. 14(a) is a comparison Nyquist plot, wherein the dashed line is the modified Ziegler-Nichols plot, and the solid line is the proposed controller. FIG. 14(b) includes comparison step responses, wherein the solid line is the modified proposed controller with gain variations 1, 0.7, and 0.5, and the dotted line is the modified Ziegler-Nichols controller with the same gain variations.

The first-order-plus-time-delay (POPTD) model is widely used in process industry. Almost all plant models can be can be approximated by a FOPTD model. Therefore, it is meaningful to study the $PI^\alpha$ control performance of this type of model. As an example, for the FOPDT model $$P_8(s) = \frac{1}{(s+1)} e^{-s},$$

the proposed controller is $$0.558 \left(1 + \frac{0.651}{s^{1.3772}}\right)$$

with respect to $\beta=0.4$, $w_c=0.775$ rad./sec., and $\Phi_m=45°$. The controller designed by the modified Ziegler-Nichols method under the conditions of the same phase margin and gain crossover frequency is $$0.459 \left(1 + \frac{1}{0.58s}\right).$$

Figure 15:
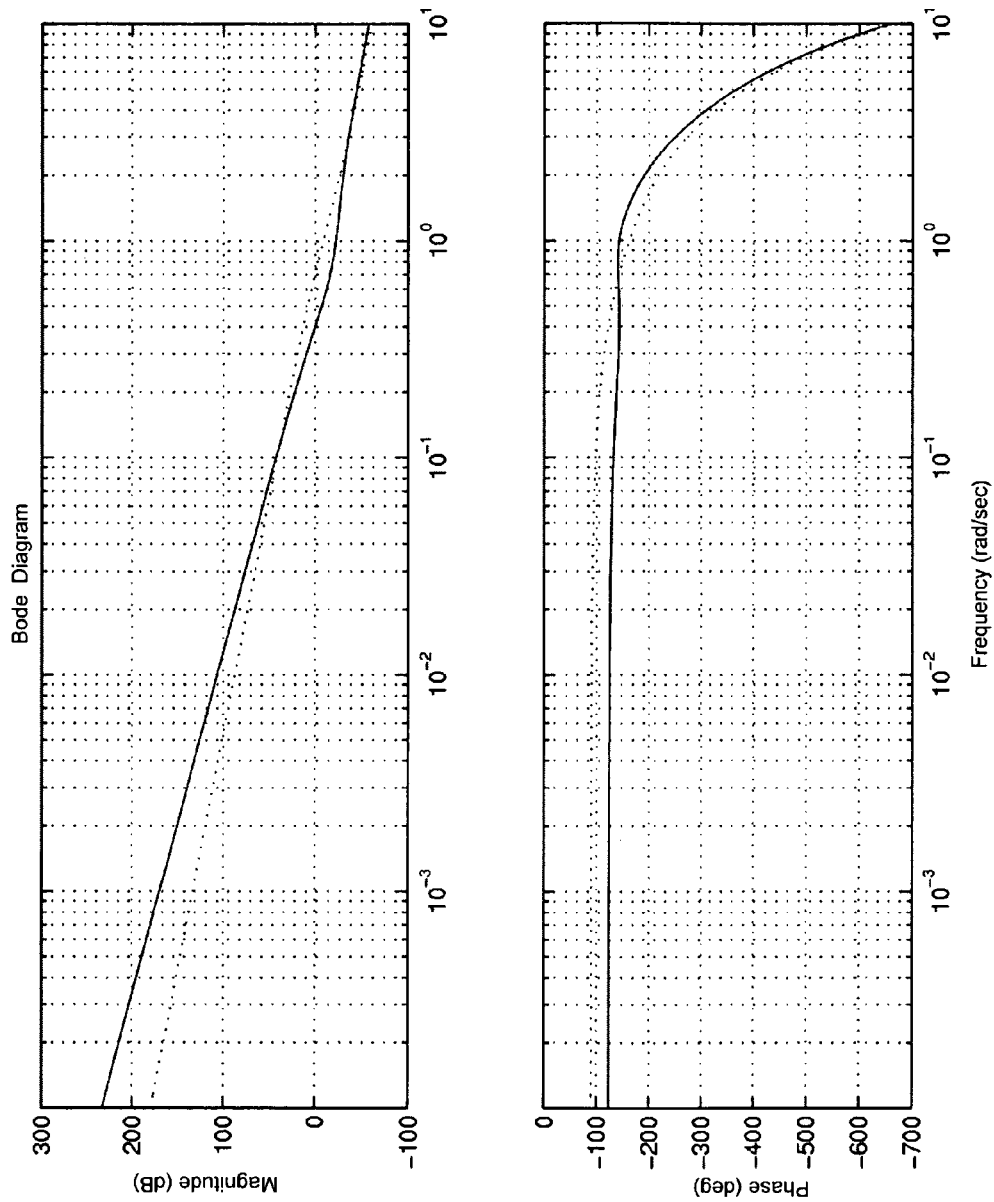
FIG. 15 includes Bode plots of $P_8(s)$.

Similarly, the Bode plots are compared in FIG. 15 where the flat phase has been achieved.

Figures 16A, 16B:
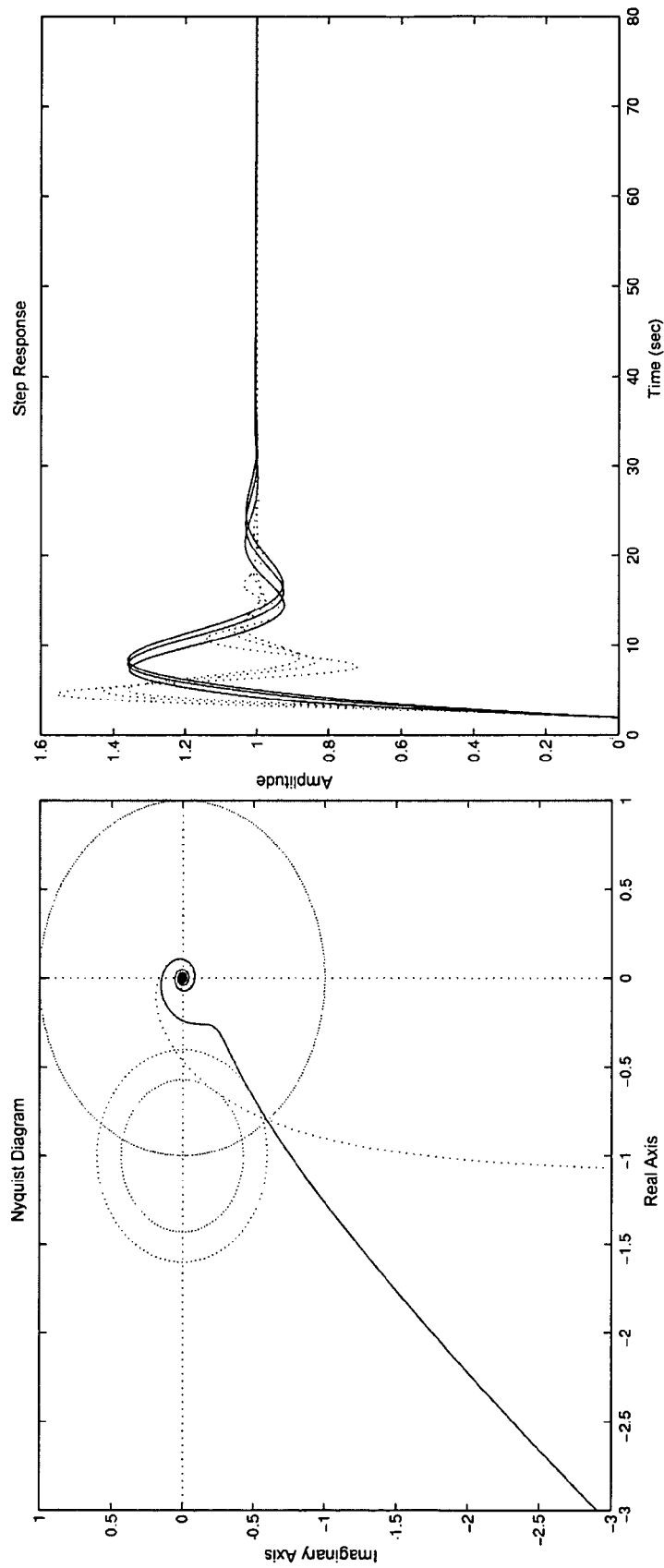
FIGS. 16(a) and 16(b) are Nyquist plots and step responses for $P_8(s)$.

FIGS. 16(a) and 16(b) summarize the comparisons of Nyquist plots and the step responses of $P_8(s)$ under different gain variations. FIG. 16(a) is a comparison Nyquist plot, wherein the dashed line is the modified Ziegler-Nichols plot, and the solid line is the proposed controller. FIG. 16(b) includes comparison step responses, wherein the solid line is the modified proposed controller with gain variations 1, 1.1, and 1.3, and the dotted line is the modified Ziegler-Nichols controller with the same gain variations. Once more, the more robust performance of $P_8(s)$ has been achieved using the $PI^\alpha$ controller designed using the methods described herein.

Another $PI^\alpha$ tuning method is proposed for a class of unknown plants in the remainder of the specification. Given the gain crossover frequency, $w_c$, the phase margin, $\Phi_m$, and the additional condition that the phase Bode plot at the specified frequency is locally flat, one can design the $PI^\alpha$ controller to ensure that the closed-loop system is robust to gain variations and to ensure that the step responses exhibit an iso-damping property. Significantly, $PI^\alpha$ can be easily applied for a first order system, while conventional controllers for FOPTD plants are not handled well. This makes $PI^\alpha$ more advantageous in practice because systems may be approximated by the first order plus a time delay model.

The PID autotuning method uses the idea of "flat phase", i.e., the phase derivative with respect to the frequency is zero at a given frequency called the "tangent frequency." The closed-loop system is robust to gain variations and the step responses exhibit an iso-damping property. However, the width of the achieved phase flatness region is difficult to adjust.

A phase shaping methodology to make the width of the phase flatness region adjustable is now considered. With a suitable phase shaper, the width of the flat phase region may be determined so as to make the whole design procedure of a robust PID controller much easier, and the system performance can be significantly enhanced. The plant gain and phase at the desired frequency, which are identified by several relay feedback tests in an iterative fashion, are used to estimate the derivatives of the amplitude and phase of the plant with respect to the frequency at the same frequency point by the well-known Bode's integral relationship. Then, these derivatives are used to design the proposed robust PID controller. The phase shaper, based on fractional-order calculus (FOC), is actually a fractional-order integrator or differentiator. No plant model is assumed during the controller design. Only several relay tests and calculations are needed. Simulation examples illustrate the effectiveness and the simplicity of the proposed method with an iso-damping property.

The variable $\alpha$ is a ratio between the integral time $T_i$ and the derivative time $T_d$ in the modified Ziegler-Nichols method for PID controller design. The variable $\alpha$ is chosen as a constant, i.e., $T_i=\alpha T_d$, in order to obtain a unique solution of PID control parameter settings. The control performances are heavily influenced by the choice of $\alpha$. Recently, the role of $\alpha$ has drawn much attention and, for the Ziegler-Nichols PID tuning method, $\alpha$ is generally assigned as 4. It is proposed that the tradeoff between the practical implementation and the system performance is the major reason for choosing the ratio between $T_i$ and $T_d$ as 4.

A new relationship between $T_i$ and $T_d$ may be given instead of the equation $T_i=4T_d$. Adding an additional "flat phase condition," in which the phase Bode plot at a specified frequency $w_c$ is locally flat where the sensitivity circle tangentially touches the Nyquist curve, implies that the system will be more robust to gain variations. In other words, if the gain increases or decreases a certain percentage, the gain margin will remain unchanged. Therefore, in this case, the step responses under various gains changing around the nominal gain will exhibit an iso-damping property, i.e., the overshoots of step responses will be almost the same. As discussed above, this additional condition can be expressed as $$\frac{d\angle G(s)}{ds}\bigg|_{s=jw_c} = 0$$

which can be equivalently expressed as:

$$\angle\left(\frac{dG(s)}{ds}\right)\bigg|_{s=jw_c} = \angle G(s)\big|_{s=jw_c}, \quad (28)$$

where $w_c$ is the frequency at the tangent point as mentioned above, called the "tangent frequency." In (28), $$G(s) = C(s)P(s) \quad (29)$$

is the transfer function of the open loop system including the controller K(s) and the plant P(s) and the PID controller can be expressed as $$C(s) = K_p\left(1 + \frac{1}{T_i s} + T_d s\right). \quad (30)$$

PID controller designed by the "flat phase" tuning method discussed above can exhibit a good iso-damping performance for some classes of plants. There are three important constants in this tuning method, namely, the "tangent phase" $\Phi_m$, the "tangent frequency $w_c$", and the "gain adjustment ratio" β, which are required to design a PID controller C(s) with an iso-damping property.

However, the "flat phase" tuning method cannot determine the width of the flat phase region. Therefore, the limited width of the flat phase makes the sensitivity circle very difficult to be tangentially touched by the Nyquist curve on the flat phase. Consequently, it is hard to select $\Phi_m$, $w_c$, and β properly.

A modified tuning method provides a PID controller transfer function C(s) (hereinafter "PID controller C(s)") and a phase shaper X(s), both to achieve the condition in (28), and to determine the width of the flat phase region. In the modified tuning method, the PID controller C(s) does not need to alone fulfill all the phase requirements. The PID controller C(s) is used to determine the upper limit frequency of the flat phase region. After that, a phase shaper X(s) is applied to achieve the lower limit frequency and also make the flat phase exactly match the phase requirement. The approximation method for the FOC operators used herein may be a continued fraction expansion (CFE). If the width of the flat phase region can be determined, it is much easier to design a robust PID controller C(s), which can ensure that the sensitivity circle tangentially touches the Nyquist curve on the local flat phase region.

A modified flat phase tuning method, phase shaper concept, and summarization of PID controller C(s) and phase shaper X(s) are now discussed. For PID controller C(s) tuning, the frequency range is concentrated around the "tangent frequency" $w_c$. If the "tangent phase" $\Phi_m$ and the "tangent frequency" $w_c$ are pre-specified, $\angle P(jw_c)$, $|P(jw_c)|$, and $s_p(w_c)$ can be obtained where $\angle P(jw_c)$ is the phase and $|P(jw_c)|$ is the gain of the plant at the specific frequency $w_c$.

$s_p(w_c)$ represents the derivative of the phase of the open loop system, which can be approximated by Bode's Integral (Karimi et al., 2002b,a) as follows:

$$s_p(w_c) = w_c \frac{d\angle P(jw)}{dw}\bigg|_{w_c} \quad (31)$$

$$\approx \angle P(jw_c) + \frac{2}{\pi}$$

$$[\ln|K_g| - \ln|P(jw_c)|],$$

in which $|K_g|=P(0)$ is the static gain of the plant. Furthermore, the PID controller C(s) parameters can be set as follows:

$$K_p = \frac{1}{\left|P(jw_c)\sqrt{1+\tan^2(\Phi_m - \angle P(jw_c))}\right|}, \quad (32)$$

$$T_i = \frac{-2}{w_c[s_p(w_c)+\hat{\Phi}] + \tan^2(\hat{\Phi})s_p(w_c)}, \text{ and} \quad (33)$$

$$T_d = \frac{-T_i w_c + 2s_p(w_c) + \sqrt{\Delta}}{2s_p(w_c)w_c^2 T_i}, \quad (34)$$

where $\hat{\Phi} = \Phi_m - \angle P(jw_c)$ and $\Delta = T_i^2 w_c^2 - 8s_p(w_c)T_i w_c - 4T_i^2 w_c^2 s_p^2(w_c)$.

In the modified tuning method, for the open loop system G(s)=C(s)X(s)P(s), the PID controller C(s) and the phase shaper X(s) are designed separately. The same tuning method proposed above is used to design the PID controller C(s). In designing the PID controllers C(s), the following guidelines should be observed:

(i) for the plant without integrator whose static phase equals 0°, selecting $\Phi_m=90°$, under the condition (28), one obtains the phase plot of C(s)P(s) with a flat phase at −90° for all the frequencies below $w_c$ as shown in FIG. 17(*a*); and (ii) for the plant with an integrator whose static phase equals −90°, selecting $\Phi_m=0°$, one obtains the phase plot of C(s)P(s) with a flat phase at −180° for all the frequencies below $w_c$, as shown in FIG. 17(*b*).

The above observations inform us that since the flat phase at −90° or −180° is already obtained, all that remains is to move the flat phase to the desired phase requirement $-\pi+\Phi_m$, which means a phase compensator (or shaper) X(s) with a constant phase $\Theta(-90°<\Theta<90°)$ is needed. This is a characteristic of fractional-order differentiators or integrators, wherein sa is defined by $(-1<\alpha<1)$. FIG. 18(*a*) provides the Bode plot of the fractional-order integrator $s^{-0.5}$, which has a constant phase at −45°. Therefore, the phase shaper may be selected as a fractional-order differentiator/integrator.

The phase shaper (or compensator) comes from the idea of FOC. However, in practice, fractional-order integrators or differentiators cannot exactly be achieved or implemented with the ideal Bode plot shown in FIG. 18(*a*) because they are infinite dimensional linear filters. A band-limit FOC implementation is important in practice, i.e., the finite-dimensional approximation of FOC should be done in a proper range of frequencies of practical interest. Therefore, a phase shaper X(s) can only be designed having a constant phase within a proper frequency range of interest.

In general, there are several approximation methods for FOC which can be divided into discretization methods and frequency domain-fitting methods. A frequency domain-fitting method can directly give the approximate s-transfer function. The existing discretization methods apply the direct power series expansion (PSE) of the Euler operator, continuous fractional expansion (CFE) of the Tustin operator, and numerical integration based method.

In designing a phase shaper X(s), two factors in selecting the approximation method should be considered:

(i) the phase shaper X(s) has a flat phase within the desired frequency range; and (ii) the phase shaper X(s) should have a lower order.

Therefore, a fourth order continued fraction expansion (CFE) of Tustin operator is employed which can give us a satisfying approximation result. The obtained discretized approximation of the fractional-order integrator $s^{-0.5}$ with the discretization sampling time $T_s=0.1$ s is given by $$X(z) = \frac{3.578z^4 + 1.789z^3 - 2.683z^2 - 0.894z + 0.224}{16z^4 - 8z^3 - 12z^2 + 4z + 1}, \quad (35)$$

with its Bode plot shown in FIG. 18(b).

From FIG. 18(b), it is seen that the phase of (35) is nearly constant at −45° within the frequency range between 4 rad./sec. and 30 rad./sec. The position of the constant phase area is greatly related to the discretization sampling time $T_s$, and the width of that area shown on the Bode plot is fixed. To make the analysis more convenient, we transform the z-transfer function (35) to the s-transfer function (36) using the Tustin operator:

$$X(s) = \frac{0.025s^4 + 17.9s^3 + 1252s^2 + 1.67e004s + 3.58e004}{s^4 + 186.7s^3 + 5600s^2 + 3.2e004s + 1.78e004}. \quad (36)$$

Figure 19:
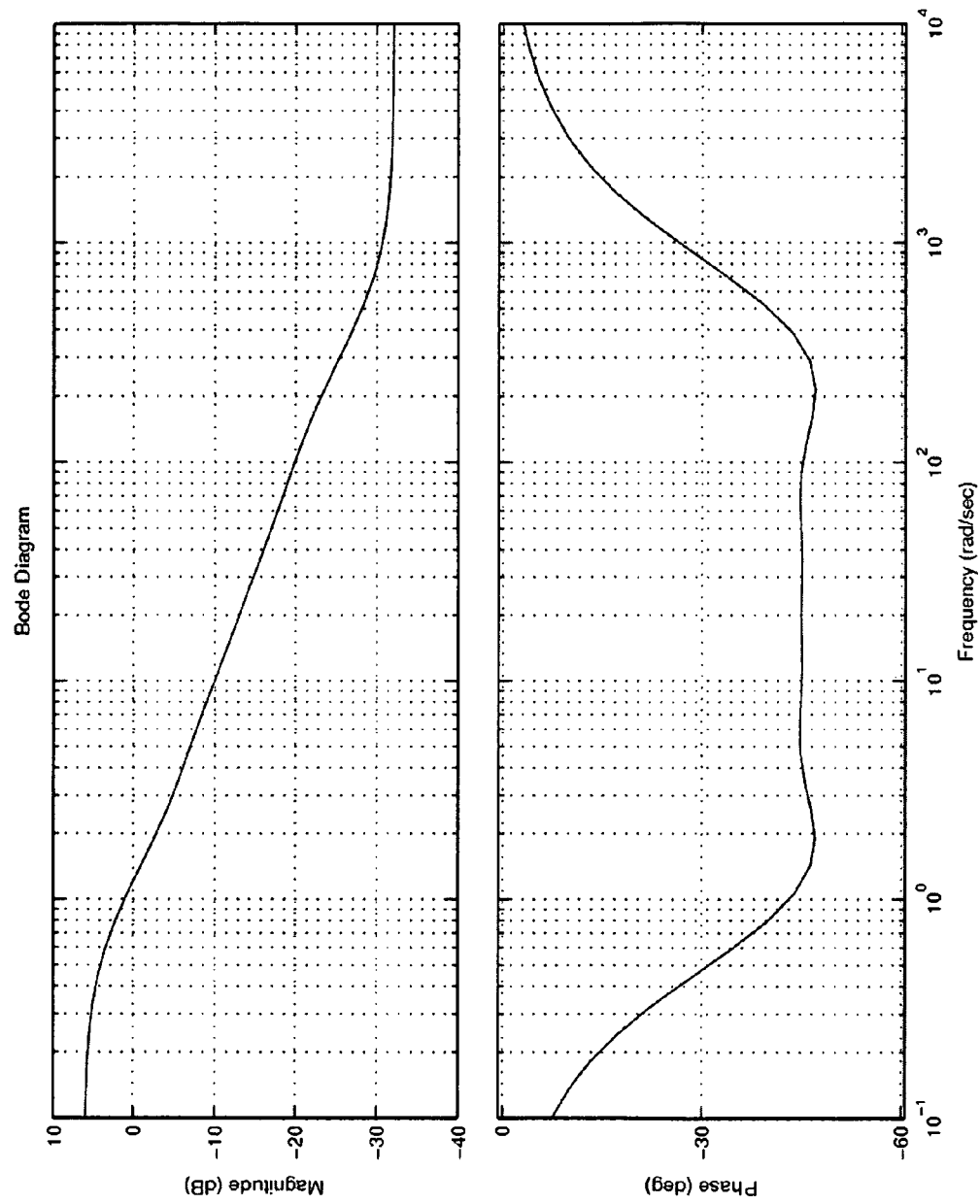
FIG. 19 includes Bode plots of the continuous-time, fourth-order approximation using CFE of Tustin operator.

The Bode plot of (36) is shown in FIG. 19. The transfer function (36) shows us an illustrative example of a phase shaper X(s) with the property of locally constant phase $\Theta(-90°<\Theta<90°)$. The position of the constant phase region is adjustable by selecting different $T_s$. Combining the PID controller C(s), which makes the system C(s)P(s) have a flat phase in the lower frequency area, the phase shaper X(s) can be used to ensure that the open loop system C(s)X(s)P(s) has the flat phase with the expected width centered at the desired position. It is evident that the constant phase area of X(s) and the flat phase area of C(s)P(s) must have an intersection, and $w_c$ for the PID controller C(s) design turns into the upper limit of the flat phase of the open loop system, and the lower limit of the flat phase is determined roughly by $$\frac{1}{10T_s}$$

rad./sec.

The PID controller C(s) and the phase shaper are designed separately. In what follows, the design procedures are summarized. Determining $s_p(w_c)$ is discussed above based on the experimental measurement of $\angle P(jw_c)$ and $|P(jw_c)|$. In summarization, for a PID controller C(s) there is given:

i) $w_c$;
ii) $\Phi_m=90°$ or 180°;
iii) measurement of $\angle P(jw_c)$ and $|P(jw_c)|$; and
iv) an estimation of $s_p(w_c)$.

Then, using (32), (33), and (34), the PID parameters $K_p$, $T_i$ and $T_d$ can be retrieved.

The steps for designing phase shaper X(s) include:

i) selecting α, based on the phase margin requirement for the open loop system, for the fractional-order integrator or differentiator $S^\alpha$;

ii) calculating the approximation transfer function for the fractional-order integrator or differentiator; and iii) selecting a proper discretization sampling time $T_s$ to determine the position of the constant phase area of the approximation transfer function.

Note that, among the above design procedures, only the phase requirement for the open loop system C(s)X(s)P(s) is considered. However, the gain must be such that the sensitivity circle touches the flat phase region of the Nyquist curve exactly, and the gain crossover frequency is settled within the flat phase. Therefore, a gain β is used to match the gain condition $$G(jw_{gc})=\beta C(jw_{gc})X(jw_{gc})P(jw_{gc})=1, \quad (37)$$

where $w_{gc}$ is the desired gain crossover frequency of the open loop system and $$\left(\frac{1}{10T_s} < w_{gc} < w_c\right).$$

It is suggested to select $w_{gc}$ at the midpoint of the flat phase area. Equivalently, one may use βX(s) to update the phase shaper X(s) so that the open loop system C(s)X(s)P(s) matches both of the phase and gain requirements.

Because $w_c$ and $T_s$ determine the width and the position of the flat phase, it is important to provide guidance in selecting $w_c$ and $T_s$. Two factors influence the selections of $w_c$ and $T_s$: (i) the desired gain crossover frequency $w_g$, should be within the flat phase region; and (ii) the flat phase area may not be too wide, i.e., the width is below 0.2 rad./sec. For better performance, it is suggested that $w_c<0.3$ rad./sec.

The modified tuning method presented above will be illustrated via various simulation examples. In the simulation, the following classes of plants, will be used:

$$P_n(s) = \frac{1}{(s+1)^{(n+3)}}, \quad n=1, 2, 3, 4; \quad (38)$$

$$P_5(s) = \frac{1}{s(s+1)^3}; \quad (39)$$

$$P_6(s) = \frac{1}{(s+1)^4}e^{-s}; \text{ and} \quad (40)$$

$$P_7(s) = \frac{1}{s(s+1)^3}e^{-s}. \quad (41)$$

For the PID controller design, because the plant $P_2(s)$ does not include any integrator, $\Phi_m$ should be set as 90° and $w_c=0.25$ rad./sec. With these specifications, the PID controller $C_2(s)$ is designed as:

$$C_2(s) = 1.095\left(1 + \frac{1}{4.892s} + 1.829s\right). \quad (42)$$

The specifications of the phase shaper $X_2(s)$ are set as α=−0.5, which means that the fractional-order integrator $s^{-0.5}$ is used as the original form of the phase shaper, $T_s=1$ sec., and $\beta=9.091$. The phase shaper $X_2(s)$ designed by the proposed method is:

$$X_2(s) = \frac{0.0226s^4 + 1.626s^3 + 11.38s^2 + 15.18s + 3.252}{s^4 + 18.67s^3 + 56s^2 + 32s + 1.778}. \quad (43)$$

For comparison, the corresponding PID controller C(s) designed by the modified Ziegler-Nichols method is $$C_{2z} = 0.232\left(1 + \frac{1}{1.011s} + 0.253s\right),$$

while the corresponding PID controller designed by the flat phase tuning method is $$C_{2f} = 0.671\left(1 + \frac{1}{2.149s} + 1.657s\right).$$

Figure 20:
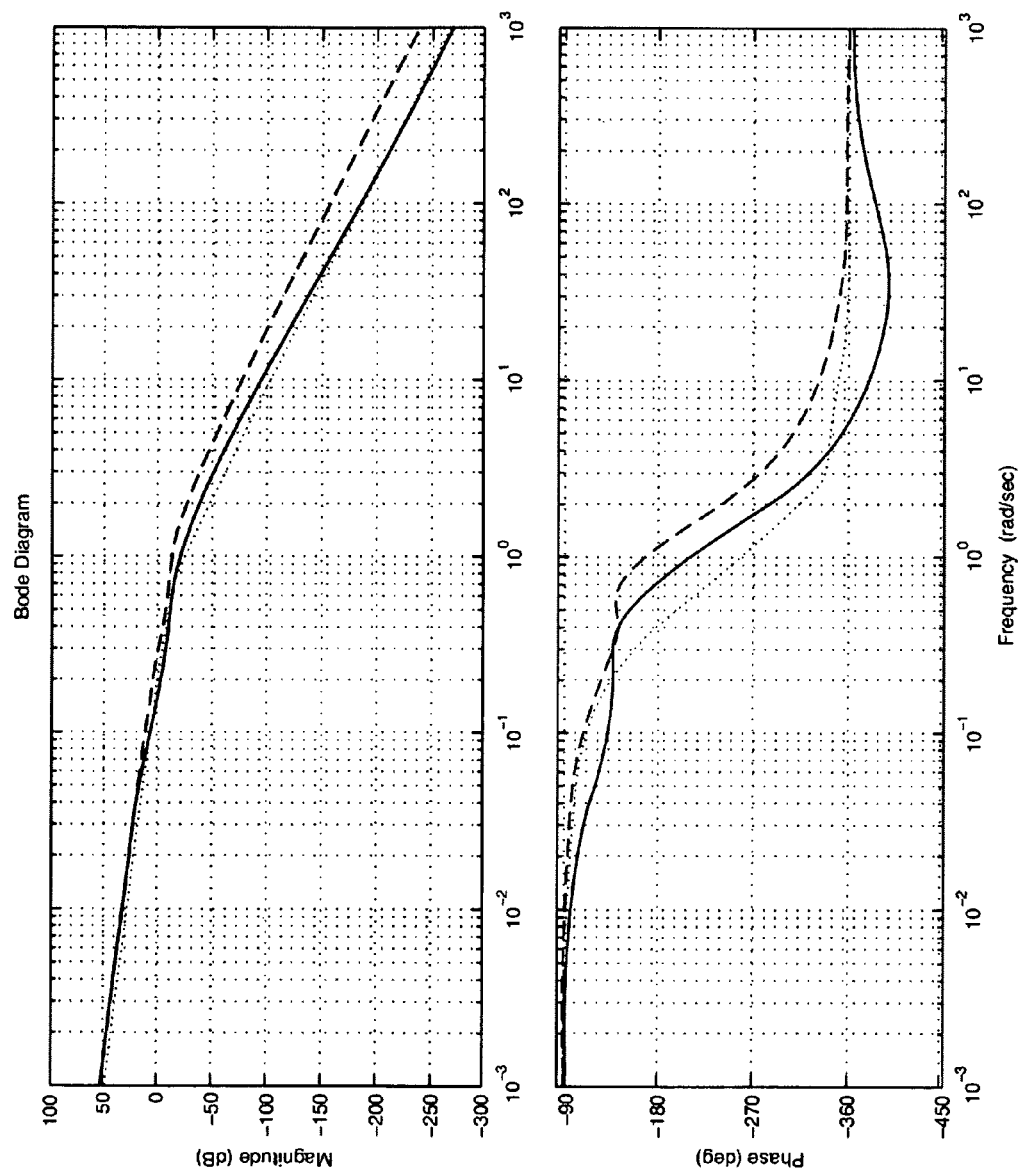
FIG. 20 is a Bode plot comparison.
Figure 21:
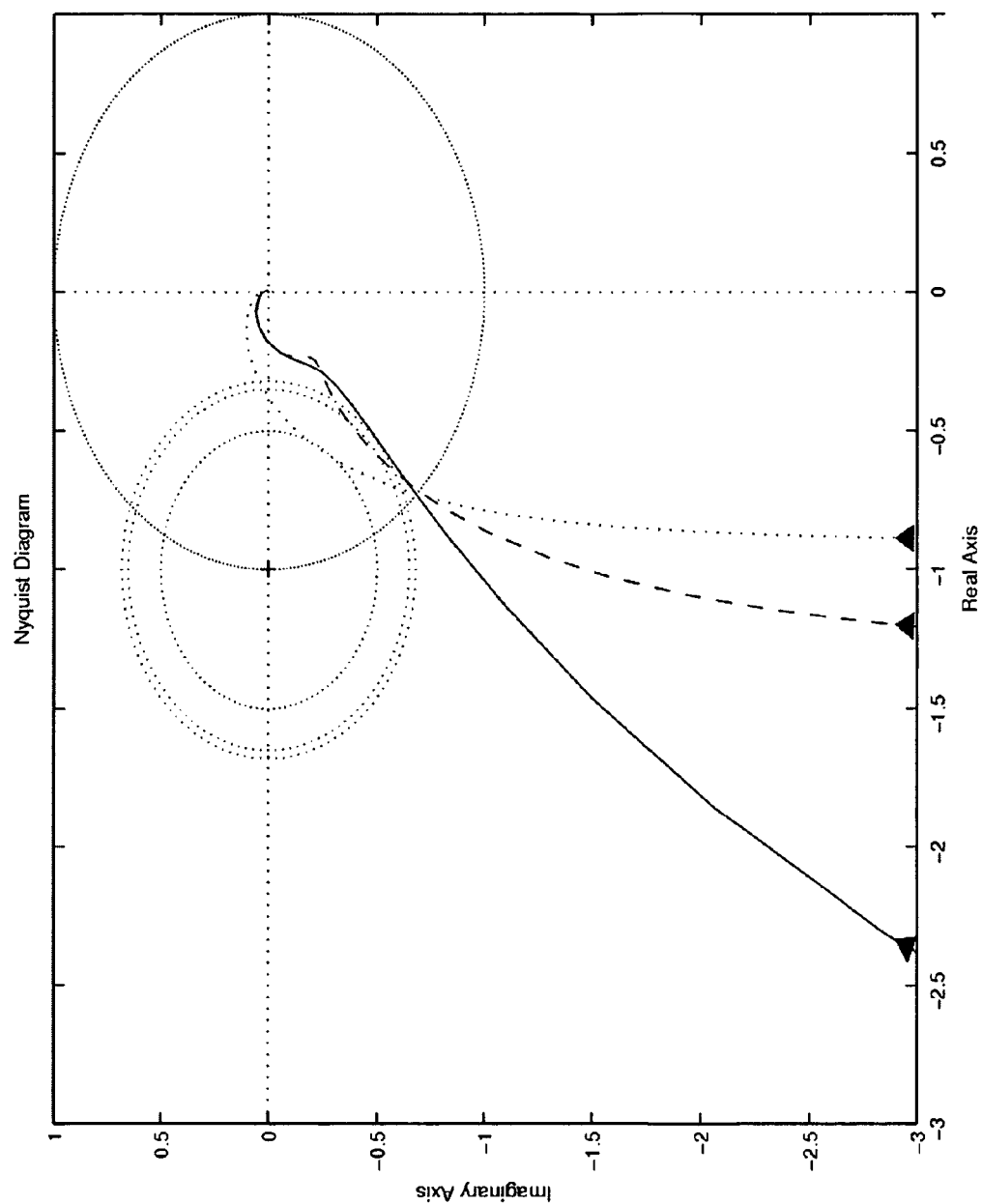
FIG. 21 is a Nyquist plot comparison.

The Bode and the Nyquist plots are compared in FIGS. 20 and 21.

Figure 22A:
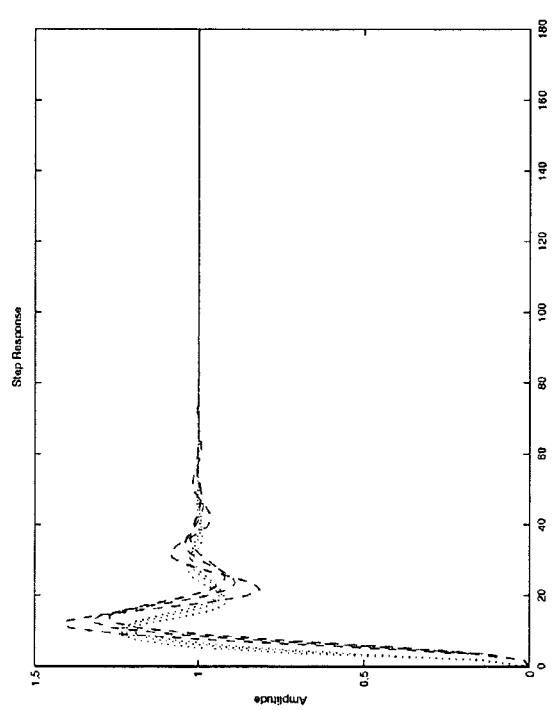
FIGS. 22(a) and 22(b) are step responses for comparison.
Figure 22B:
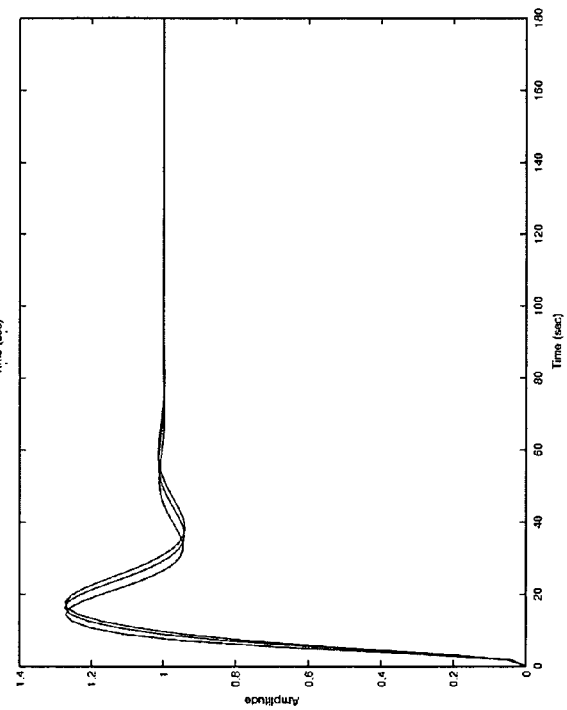

From FIG. 20, it is seen that the phase plot between 0.1 rad./sec. and 0.3 rad./sec. is flat. The phase margin roughly equals 45°. In FIG. 21, the Nyquist curve of the open loop system is tangential to the sensitivity circle at the flat phase. The flat phase is wide enough to accommodate the gain variation of the plant. The step responses of the closed-loop systems are compared in FIGS. 22(*a*) and 22(*b*). Shown in FIG. 22(*a*) are the step responses of the closed-loop system with the modified Ziegler-Nichols controller $C_{2z}$ in dashed lines, and the "flat phase" PID controller $C_{2f}$ in dotted lines. Shown in FIG. 22(*b*) are the step responses of the closed-loop system with "flat phase" PID controller $C_{2f}$ plus a phase shaper $X_2(s)$. Comparing the closed-loop system with the proposed modified controller $C_2$ to the modified Ziegler-Nichols controller $C_{2z}$, the overshoots of the step response from the proposed scheme remain invariant under gain variations. However, the overshoots of the modified Ziegler-Nichols controller $C_{2z}$ change remarkably.

For the plant with an integrator $P_5(s)$, one should set $\Phi_m=0°$ as remarked earlier. Here, $w_c$ is selected as 0.3 rad./sec. The PID controller $C_5(s)$ is $$C_5(s) = 0.262\left(1 + \frac{1}{3.055s} + 0.85s\right).$$

The phase shaper $X_5(s)$ is $$X_5(s) = \frac{0.07245s^4 + 0.4508s^3 + 0.4508s^2 + 0.08587s + 0.00159}{0.0081s^4 + 0.1944s^3 + 0.4536s^2 + 0.2016s + 0.0144} \quad (44)$$

with respect to $\alpha=0.5$, $T_s=3$ sec., and $\beta=0.022$.

The controller designed by the modified Ziegler-Nichols method is $$C_{5z} = 0.34\left(1 + \frac{1}{7.288s} + 1.822s\right),$$

while the corresponding PID controller designed by the "flat phase" tuning method is $$C_{5f} = 0.395\left(1 + \frac{1}{6.567s} + 1.932s\right).$$

Figure 23:
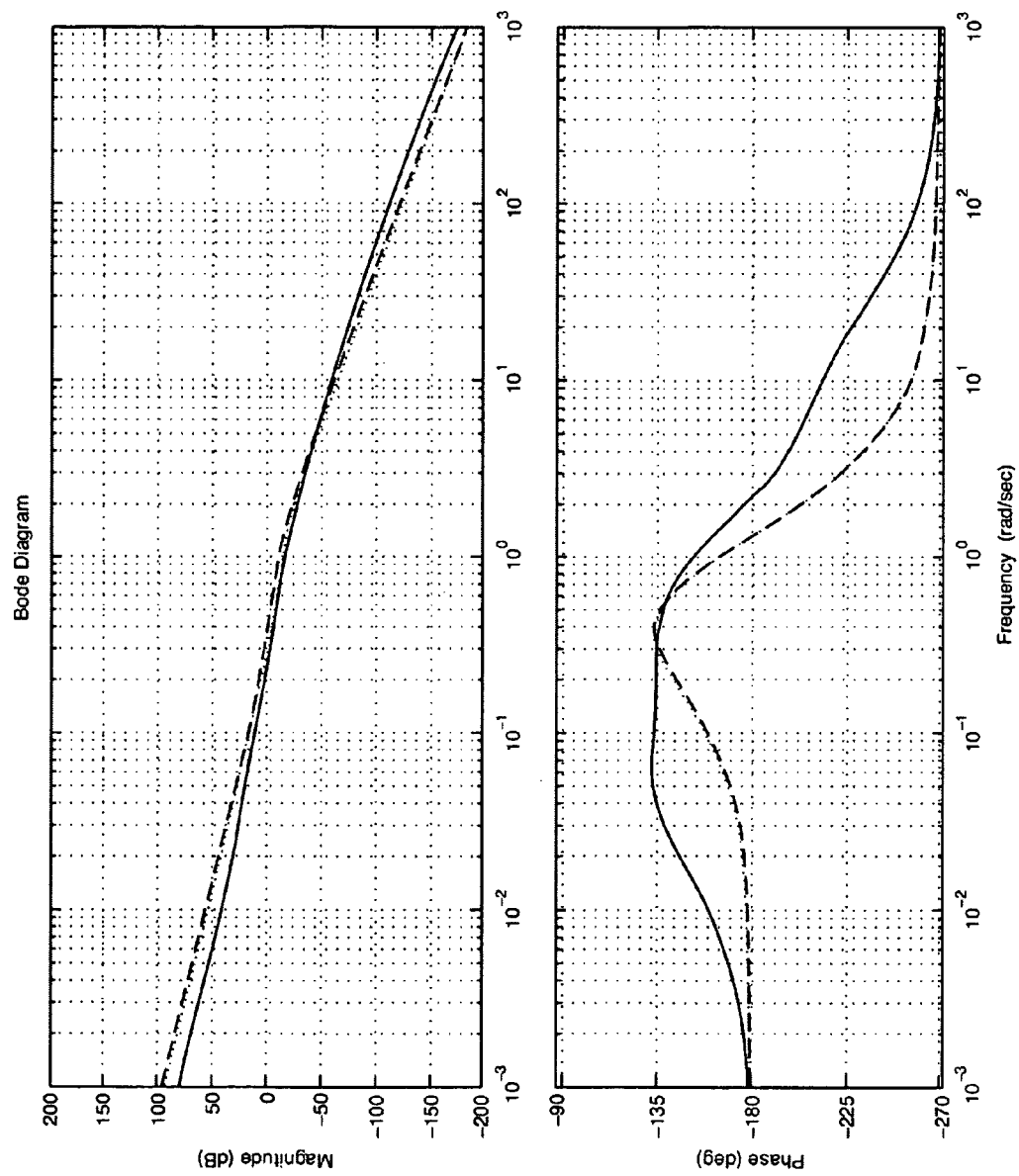
FIG. 23 includes a Bode plot comparison for a system with an integrator.

The Bode plot of this situation, shown in FIG. 23, is quite different from the general plants $P_n(s)$. The flat phase occurs at the convex area, not at the inflation. The dashed line is the modified Ziegler-Nichols controller $C_{5z}$, and the dotted line is the "flat phase" PID controller $C_{5f}$. The solid line is the proposed controller $C_5$.

Figure 24:
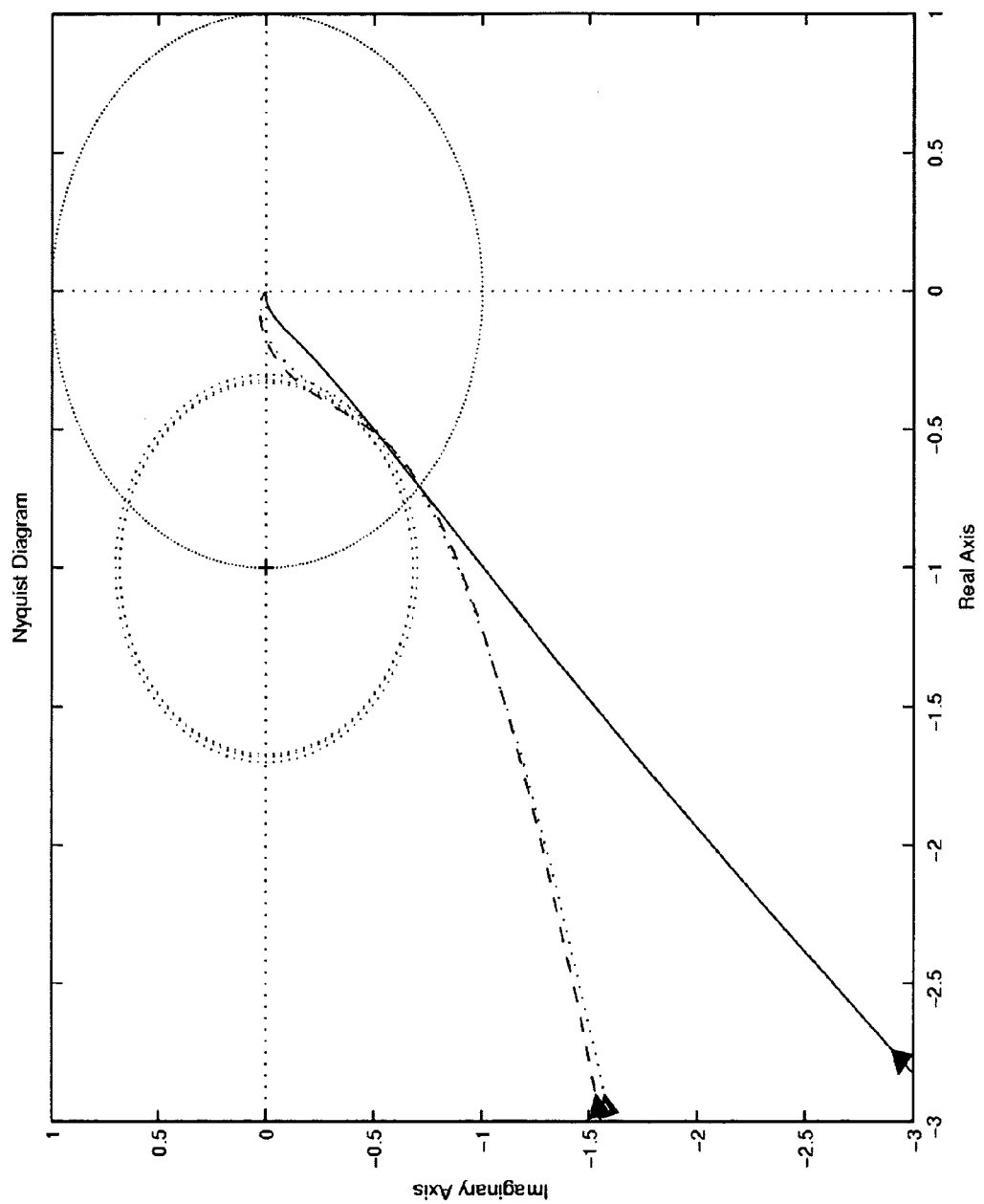
FIG. 24 includes a Nyquist plot comparison for a system with an integrator.

The Nyquist plot is displayed in FIG. 24, showing a comparison of the modified Ziegler-Nichols controller $C_{5z}$ (dashed line), the "flat phase" PID controller $C_{5f}$ (dotted line), and the proposed controller $C_5$ (solid line).

Figure 25A:
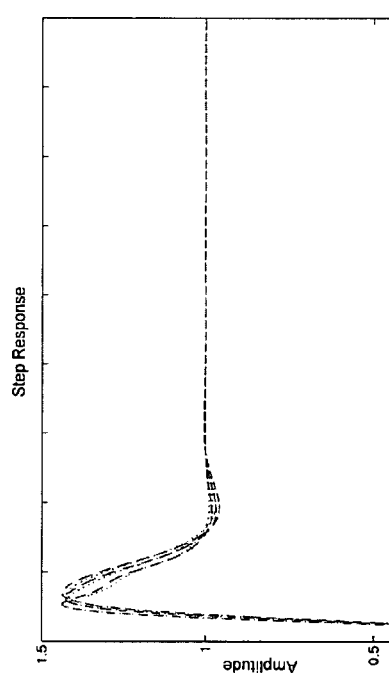
FIGS. 25(a) and 25(b) are step responses for comparison for a system with an integrator.
Figure 25B:
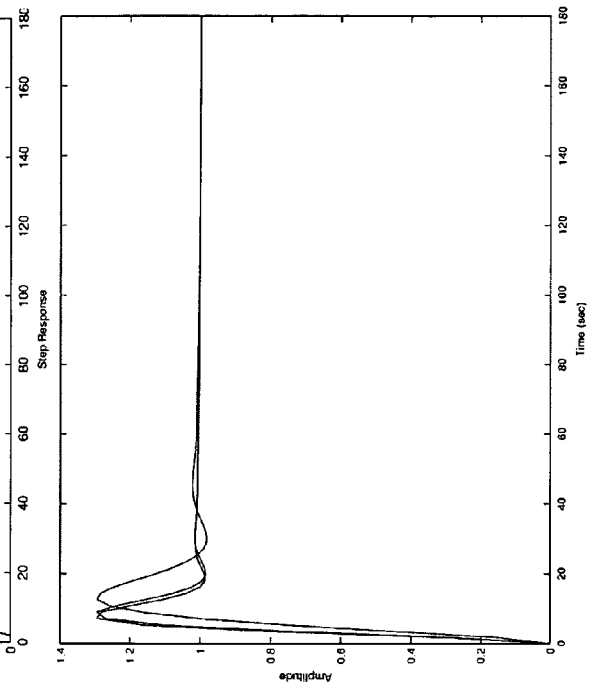

Additionally, FIG. 25(*a*) shows step responses, comparing the modified Ziegler-Nichols controller $C_{5z}$ and "flat phase" controller $C_{5f}$. Finally, FIG. 25(*b*) compares the same responses as FIG. 25(*a*), but with use of the phase shaper $X_5(s)$. From the step response comparison in FIG. 25, the proposed controller $C_5$, unlike the "flat phase" PID controller $C_{5f}$, exhibits an obviously more robust performance than the modified Ziegler-Nichols controller $C_{5z}$ for the iso-damping property.

For the plant with a time delay $P_6(S)$, the proposed PID controller is $$C_6(s) = 0.904\left(1 + \frac{1}{1.995s} + 1.721s\right)$$

with respect to $w_c=0.2$ rad./sec. and $\Phi m=90°$. The proposed phase shaper is $$X_6(s) = \frac{0.0166s^4 + 1.193s^3 + 8.348s^2 + 11.13s + 2.385}{s^4 + 18.67s^3 + 56s^2 + 32s + 1.778} \quad (45)$$

with respect to $\alpha=-0.5$, $T_s=1$ sec., and $\beta=6.667$.

The controller designed by the modified Ziegler-Nichols method is $$C_{6z} = 0.5\left(1 + \frac{1}{1.808s} 0.452s\right),$$

while the corresponding PID controller designed by the "flat phase" tuning method is $$C_{6f} = 0.662\left(1 + \frac{1}{1.729s} + 1.958\right).$$

Figure 26:
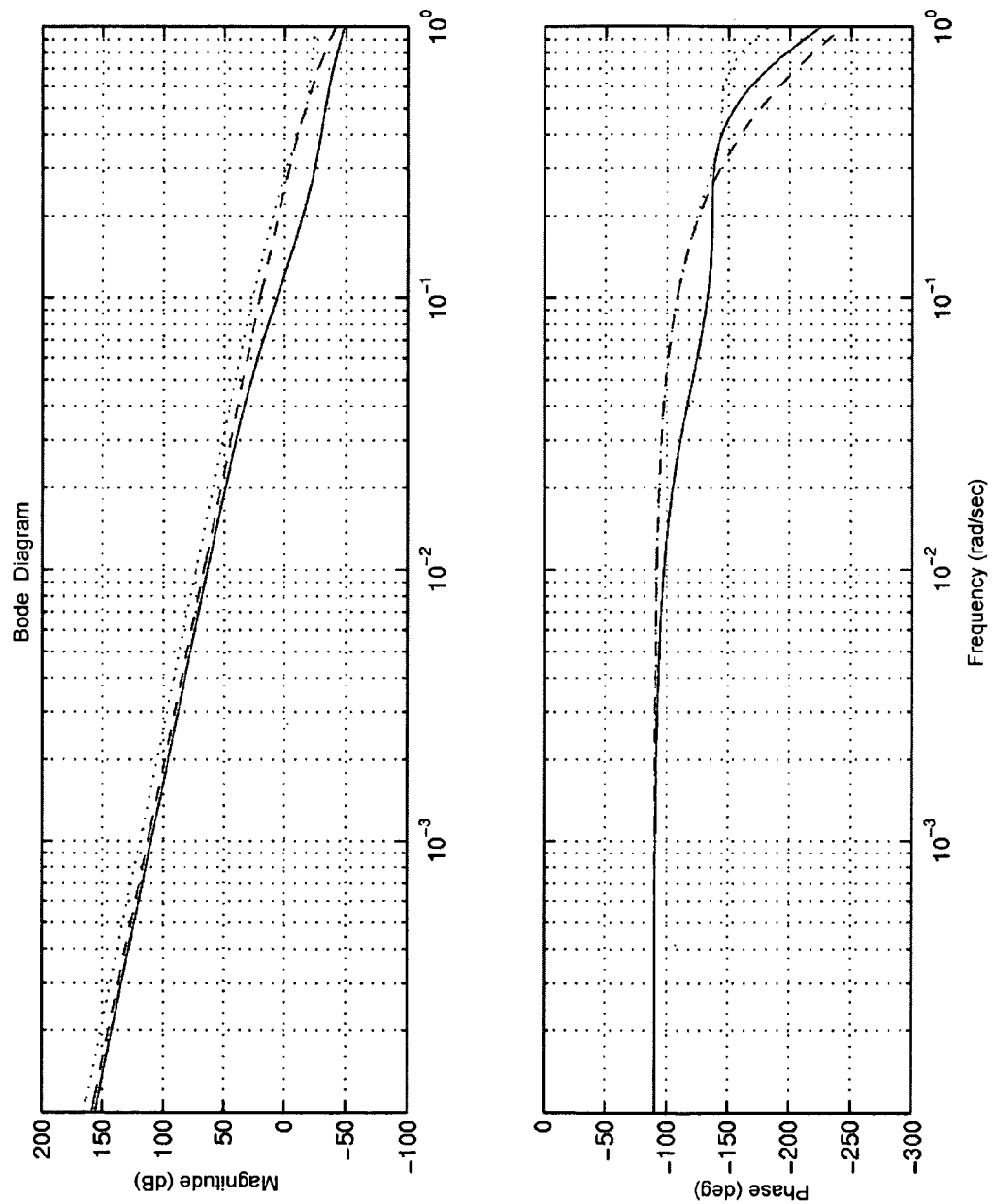
FIG. 26 includes a Bode plot comparison for a system with a time delay.

The Bode plots of the plant with a time delay are shown in FIG. 26, comparing the modified Ziegler-Nichols controller $C_{6z}$ (dashed line) with the "flat phase" PID controller $C_{6f}$ (dotted lines) and the proposed controller $C_6$ (solid lines).

Figure 27:
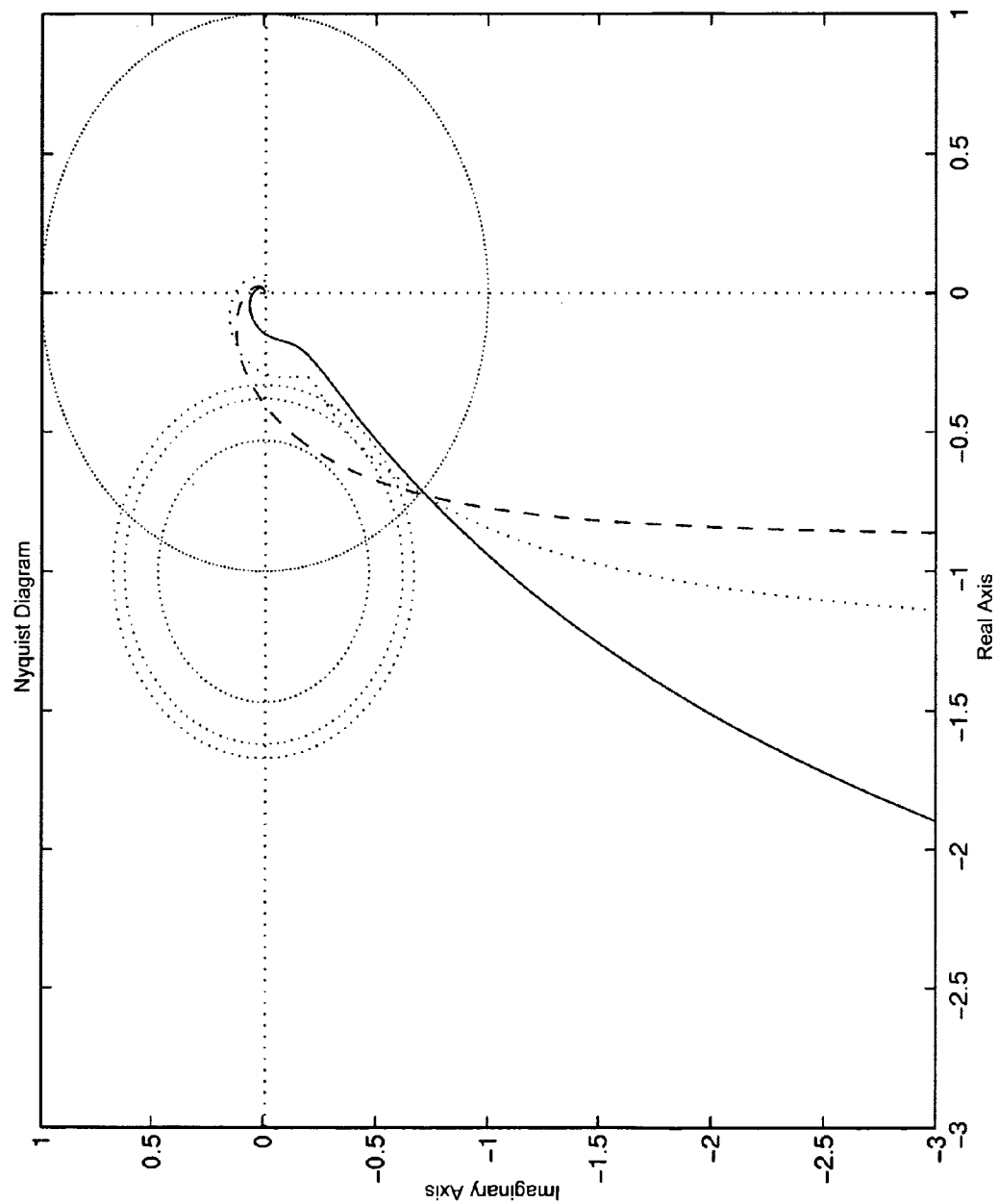
FIG. 27 includes a Nyquist plot comparison for a system with a time delay.

The Nyquist plot is shown in FIG. 27, comparing the modified Ziegler-Nichols controller $C_{6z}$ (dashed line) with the "flat phase" PID controller $C_{6f}$ (dotted lines) and the proposed controller $C_6$ (solid lines).

Figure 28A:
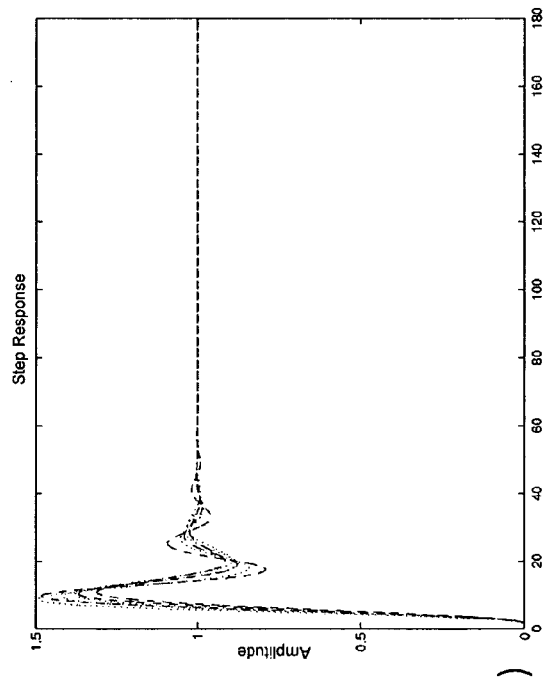
FIGS. 28(a) and 28(b) are step responses for comparison of a system with a time delay.
Figure 28B:
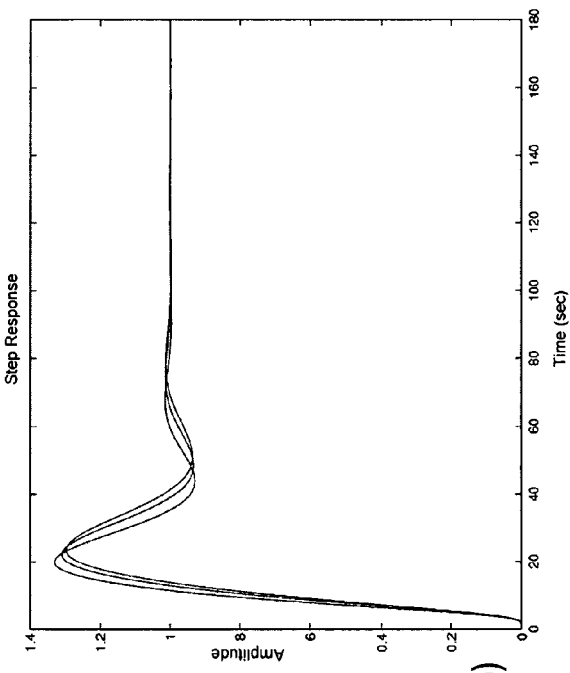

FIG. 28(a) shows the step responses of the system with a modified Ziegler-Nichols controller $C_{6z}$ (dashed line) with the "flat phase" PID controller $C_{6f}$ (dotted lines). FIG. 28(b) shows the step response of the plant with a time delay using the phase shaper $X_6(s)$. From the design procedure and these plots, one can see that the response does not vary much when compared to the results for the general plants, $P_n(s)$. So, the proposed method is also applicable for plants with a time delay.

For the plant with an integrator and a time delay $P_7(s)$, the proposed PID controller is $$C_7(s) = 0.228\left(1 + \frac{1}{4.002s} + 1.343s\right)$$

with respect to $w_c = 0.25$ rad./sec. and $\Phi_m = 0$. The proposed phase shaper is $$X_7(s) = \frac{4.528s^4 + 56.35s^3 + 112.7s^2 + 42.93s + 1.59}{0.506s^4 + 24.3s^3 + 113.4s^2 + 100.8s + 14.4} \quad (46)$$

with respect to $\alpha = 0.5$, $T_s = 1.5$ sec., and $\beta = 0.022$.

The controller designed by the modified Ziegler-Nichols method is $$C_{7z} = 0.266\left(1 + \frac{1}{10.136s} + 2.534s\right).$$

The corresponding PID controller designed by the flat phase tuning method is $$X_{7f} = 0.268\left(1 + \frac{1}{10.795s} + 2.438\right).$$

Figure 29:
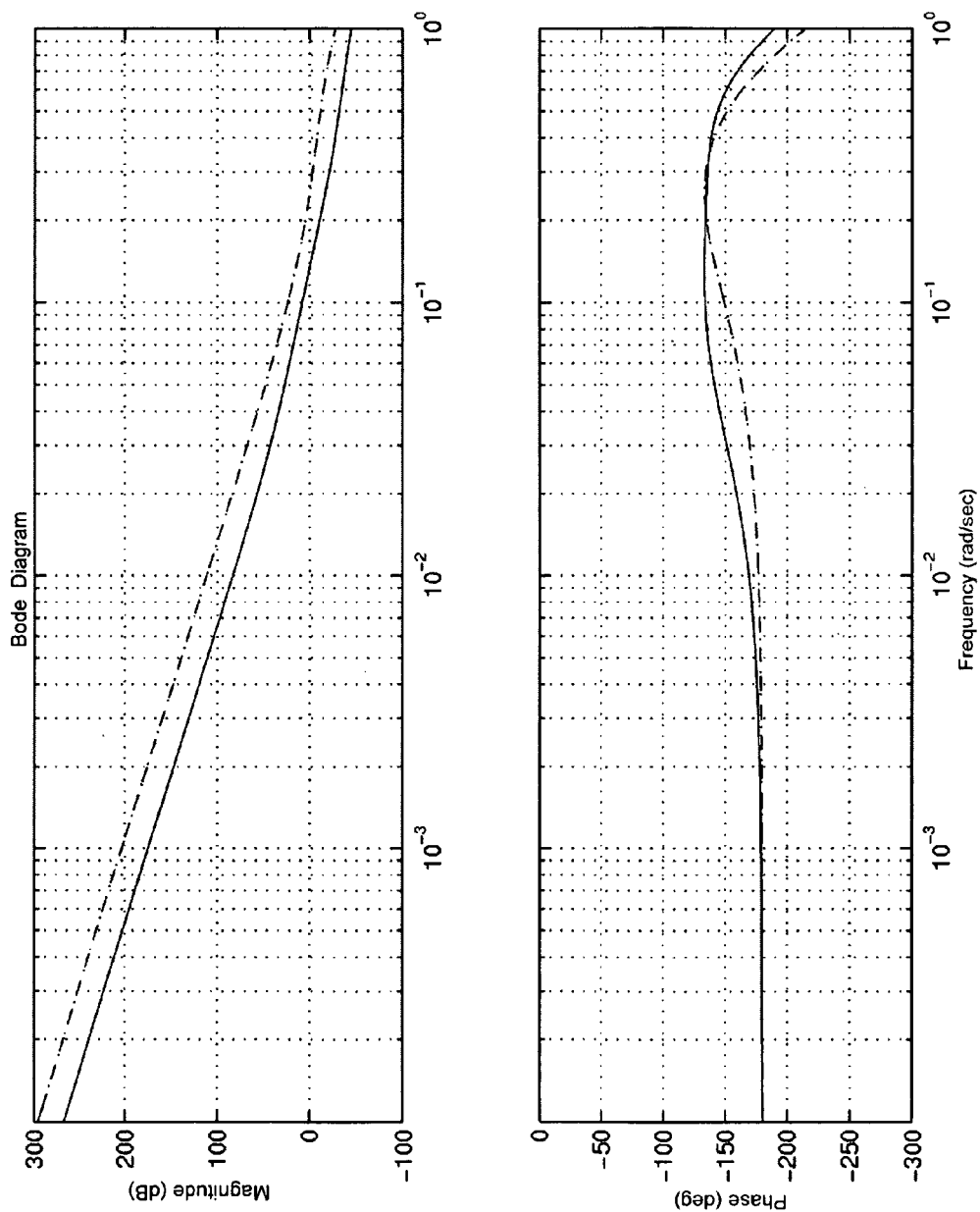
FIG. 29 includes a Bode plot comparison for a system with an integrator and a time delay.
Figure 30:
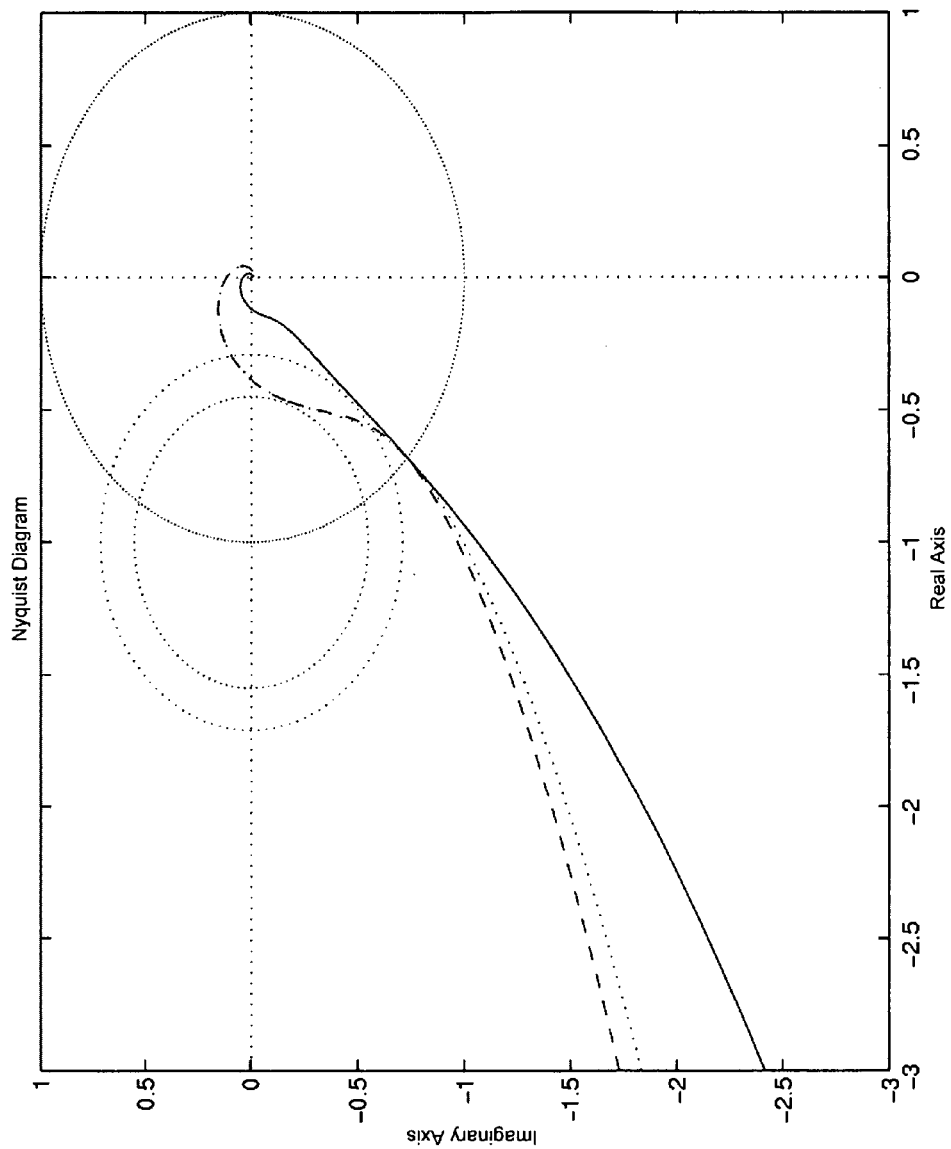
FIG. 30 is a Nyquist plot comparison with a system with an integrator and a time delay.

The frequency and time response results are compared in FIGS. 29, 30, and 31.

FIG. 29 is a Bode plot, comparing the modified Ziegler-Nichols controller $C_{7z}$ (dashed line) with the "flat phase" PID controller $C_{7f}$ (dotted line), and with the proposed controller $C_7$ (solid line) when an integrator and a time delay is used.

FIG. 30 is a Nyquist plot, comparing the modified Ziegler-Nichols controller $C_{7z}$ (dotted line) with the "flat phase" PID controller $C_{7f}$ (dotted line) and the proposed controller $C_7$ (solid line) for the same.

Figures 31A, 31B:
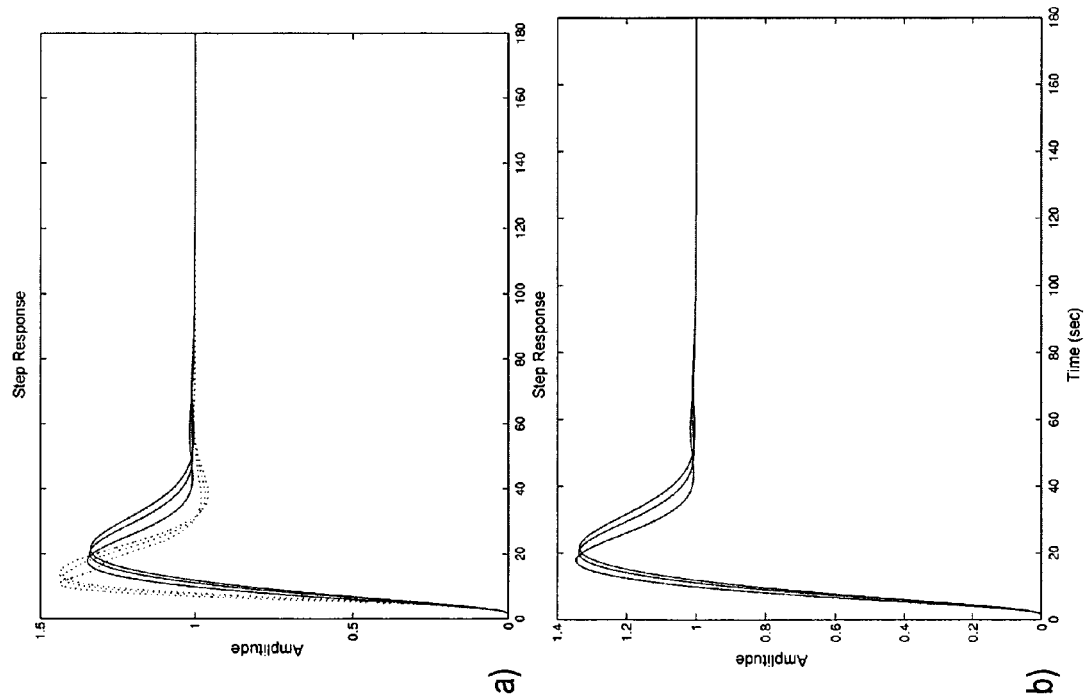
FIGS. 31(a) and 31(b) are step responses for a system with an integrator and a time delay.

Finally, FIG. 31(a) shows step responses of the modified Ziegler-Nichols controller $C_{7z}$ (dashed) and the "flat phase" PID controller $C_{7f}$ (dotted lines). FIG. 31(b), for comparison, shows step responses of the system using an integrator and a time delay, along with the phase shaper $X_7(s)$.

As the width of the achieved phase flatness region is difficult to adjust with the flat phase tuning method, a phase shaper is proposed to make the width of the phase flatness region adjustable. With a suitable phase shaper, the width of the flat phase region may be determined so as to make the whole design procedure of a robust PID controller much easier, and the system performance can be significantly enhanced. The plant gain and phase at the desired frequency, which are identified by several relay feedback tests in an iterative fashion, are used to estimate the derivatives of the amplitude and phase of the plant with respect to the frequency at the same frequency point by Bode's well-known integral relationship. Then, these derivatives are used to design the proposed robust PID controller. The phase shaper, based on FOC, is actually a fractional-order integrator or differentiator. No plant model is assumed during the controller design. Only several relay tests and calculations are needed. Simulation examples illustrate the effectiveness and the simplicity of the proposed method with an iso-damping property. From the illustrative simulation, it can be seen that the proposed phase shaping approach to robust PID controller tuning gives a satisfying performance for a large class of plants.

While specific embodiments and applications of the present disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the present disclosure disclosed herein without departing from the spirit and scope of the present disclosure.

What is claimed is:

1. A method for tuning a fractional-order proportional-integral (PI) controller to control a process of an industrial plant, the method comprising:

for a given fractional-order PI controller C(s) that is a function of proportional gain $K_p$, integral gain $K_i$, fractional integrator order $\alpha$, and Laplace variable s, deriving values for controller parameters $K_p$, $K_i$, and $\alpha$ that satisfy a flat phase condition represented by $$\angle \frac{dG(s)}{ds}\bigg|_{s=jw_c} = \angle G(s)|_{s=jw_c}.$$

tuning the controller parameters $K_p$, $K_i$, and $\alpha$ based on iteratively testing the process of the industrial plant P(s) using a relay feedback approach; and controlling the process of the industrial plant P(s) by using the controller C(s), the controller C(s) comparing a measured value from the process with a reference setpoint value and calculating a new manipulated process output that brings the measured value of the process toward the reference setpoint value, wherein G(s) is the transfer function of the open loop system including the controller C(s) and the process of the industrial plant P(s) such that G(s)=C(s)P(s), and wherein $w_c$ is the gain crossover frequency at which the sensitivity circle tangentially touches the Nyquist curve.

2. The method of claim 1, wherein deriving $K_p$ ensures that a sensitivity circle tangentially touches a Nyquist curve on a flat phase.

3. The method of claim 1, wherein deriving values for $K_i$ and $\alpha$ ensures that a slope of a Nyquist curve is approximately equal to a phase of an open loop system at a given frequency.

4. The method of claim 3, wherein the slope of the Nyquist curve at any specific frequency w is given by $$\angle \frac{dG(jw)}{dw} = \phi_0 - \frac{(\alpha+1)\pi}{2} +$$
$$\tan^{-1}\left[\frac{s_\alpha w^\alpha \sin\frac{(\alpha+1)\pi}{2} + s_\alpha K_i + s_p w^\alpha \cos\frac{(\alpha+1)\pi}{2} - \alpha K_i}{s_\alpha w^\alpha \cos\frac{(\alpha+1)\pi}{2} - s_p w^\alpha \sin\frac{(\alpha+1)\pi}{2} - s_p K_i}\right].$$

wherein $\phi_0 = \angle P(jw)$, and wherein $s_\alpha(w) = w \, d \ln|P(jw)|/dw$ and $s_p(w) = w \, d\angle P(jw)/dw$.

5. The method of claim 3, wherein $K_i$ and $\alpha$ are derived to satisfy a relationship $$K_i = \frac{w^\alpha}{2s_p}\left[\alpha\cos\frac{(\alpha+1)\pi}{2} - 2s_p\sin\frac{(\alpha+1)\pi}{2} + \sqrt{\Delta}\right].$$

wherein $\Delta$ is defined as $$\Delta = \alpha^2\cos^2\frac{(\alpha+1)\pi}{2} - 4\alpha s_p\cos\frac{(\alpha+1)\pi}{2}\sin\frac{(\alpha+1)\pi}{2} + 4s_p^2\sin^2\frac{(\alpha+1)\pi}{2} - 4s_p^2.$$

and $s_p(w) = w \, d\angle P(jw)/dw$.

6. The method of claim 5, wherein $s_p$ is calculated from an approximation $$s_p(w_0) = w_0 \frac{d\angle P(jw)}{dw}\bigg|_{w_0} \approx \angle P(jw_0) + \frac{2}{\pi}[\ln|K_g| - \ln|P(jw_0)|],$$

wherein $w_0$ is a specific frequency, $|K_g|=P(0)$ is a static gain of the process of the industrial plant P(s), $\angle P(jw_0)$ is the phase, and $|P(jw_0)|$ is the gain of the process of the industrial plant P(s) at the specific frequency $w_0$.

7. The method of claim 6, wherein $\alpha$ is derived to satisfy an approximate relationship given by $$\frac{A(s_p)\alpha^2 + B(s_p)\alpha + C(s_p)}{\alpha^2 + D(s_p)\alpha + E(s_p)} = \Phi_m - \pi - \phi_0,$$

wherein $\Phi_m$ is a desired phase gain margin, wherein $\phi_0 = \angle P(jw)$, and wherein $A(s_p)$, $B(s_p)$, $C(s_p)$, $D(s_p)$, and $E(s_p)$ are polynomial functions of $s_p$.

8. The method of claim 7, wherein $K_p$ is derived to satisfy a relationship $$|G(jw_c)| = K_p|P(jw_c)|\sqrt{\left(1 + \frac{K_i}{w_c^\alpha}\cos\frac{\alpha\pi}{2}\right)^2 + \left(\frac{K_i}{w_c^\alpha}\sin\frac{\alpha\pi}{2}\right)^2} = 1.$$

9. The method of claim 1, wherein deriving values for $K_p$, $K_i$, and $\alpha$ is accomplished through use of a tuning table.

10. A method for tuning a fractional-order proportional-integral (PI) controller to control an industrial plant, given the gain crossover frequency, $w_c$, the method comprising:
for a given PI controller C(s), which is a function of proportional gain $K_p$, integral gain $K_i$, fractional integrator order $\alpha$, and Laplace variable s, and an industrial plant, P(s), obtaining measurements of $\angle P(jw_c)$ and $|P(jw_c)|$ using iterative relay feedback tests of the industrial plant P(s);
approximating a derivative of the industrial plant phase, $\angle P(jw_c)$, provided by a relationship $$s_p(w_c) = w_c \frac{d\angle P(jw)}{dw}\bigg|_{w_c} \approx \angle P(jw_c) + \frac{2}{\pi}[\ln|K_g| - \ln|P(jw_c)|],$$

tuning the controller C(s) based on the approximated derivative of the industrial plant phase, $\angle P(jw_c)$; and
controlling the industrial plant P(s) using controller C(s), the controller C(s) comparing a measured value from the industrial plant P(s) with a reference setpoint value and calculating a new manipulated output that brings the measured value of the industrial plant P(s) toward the reference setpoint value,
wherein $|K_g|=P(0)$ is a static gain of the industrial plant P(s), and wherein $|P(jw_c)|$ is the gain of the industrial plant P(s) at the frequency $w_c$.

11. The method of claim 10, further comprising deriving values for $K_p$, $K_i$, and $\alpha$ that satisfy a flat phase condition represented by $\angle dG(s)/ds|_{s=jw_c} = \angle G(s)|_{s=jw_c}$, wherein C(s) is the transfer function of the open loop system including the controller C(s) and the industrial plant P(s) such that G(s)= C(s)P(s) and C(s), and wherein $w_c$ is the gain crossover frequency.

12. The method of claim 11, wherein deriving values for $K_i$ and $\alpha$ ensures that a slope of a Nyquist curve is approximately equal to a phase of an open loop system at a given frequency.

13. The method of claim 12, wherein the slope of the Nyquist curve at any specific frequency w is given by $$\angle \frac{dG(jw)}{dw} = \phi_0 - \frac{(\alpha+1)\pi}{2} +$$
$$\tan^{-1}\left[\frac{s_\alpha w^\alpha \sin\frac{(\alpha+1)\pi}{2} + s_\alpha K_i + s_p w^\alpha \cos\frac{(\alpha+1)\pi}{2} - \alpha K_i}{s_\alpha w^\alpha \cos\frac{(\alpha+1)\pi}{2} - s_p w^\alpha \sin\frac{(\alpha+1)\pi}{2} - s_p K_i}\right].$$

wherein $\phi_0 = \angle P(jw)$, and wherein $s_\alpha(w) = w \, d \ln|P(jw)|/dw$ and $s_p(w) = w \, d\angle P(jw)/dw$.

14. The method of claim 12, wherein $K_i$ is derived to satisfy a relationship $$K_i = \frac{w^\alpha}{2s_p}\left[\alpha\cos\frac{(\alpha+1)\pi}{2} - 2s_p\sin\frac{(\alpha+1)\pi}{2} + \sqrt{\Delta}\right].$$

wherein $\Delta$ is defined as $$\Delta = \alpha^2\cos^2\frac{(\alpha+1)\pi}{2} - 4\alpha s_p\cos\frac{(\alpha+1)\pi}{2}\sin\frac{(\alpha+1)\pi}{2} + 4s_p^2\sin^2\frac{(\alpha+1)\pi}{2} - 4s_p^2.$$

15. The method of claim 14, wherein α is derived to satisfy an approximate relationship given by $$\frac{A(s_p)\alpha^2 + B(s_p)\alpha + C(s_p)}{\alpha^2 + D(s_p)\alpha + E(s_p)} = \Phi_m - \pi - \phi_0,$$

wherein $\Phi_m$ is a desired phase gain margin, wherein $\Phi_0 = \angle P(jw)$, and wherein $A(s_p)$, $B(s_p)$, $C(s_p)$, $D(s_p)$, and $E(s_p)$ are polynomial functions of $s_p$.

16. The method of claim 15, wherein deriving $K_p$ ensures that a sensitivity circle tangentially touches a Nyquist curve on a flat phase.

17. The method of claim 16, wherein $K_p$ is derived to satisfy a relationship $$|G(jw_c)| = K_p|P(jw_c)|\sqrt{\left(1 + \frac{K_i}{w_c^\alpha}\cos\frac{\alpha\pi}{2}\right)^2 + \left(\frac{K_i}{w_c^\alpha}\sin\frac{\alpha\pi}{2}\right)^2} = 1.$$

18. A computer readable storage medium having stored thereon computer executable instructions for performing a method for tuning a fractional-order proportional-integral (PI) controller to control an industrial plant P(s), the method comprising:

for a given PI controller C(s) that is a function of proportional gain $K_p$, integral gain $K_i$, fractional integrator order α, and Laplace variable s, deriving values for controller parameters $K_p$, $K_i$, and α that satisfy a flat phase condition represented by $$\angle\left(\frac{dG(s)}{ds}\right)\bigg|_{s=jw_c} = \angle G(s)|_{s=jw_c}.$$

tuning the controller parameters $K_p$, $K_i$, and α based on iteratively testing the industrial plant P(s) using a relay feedback approach; and controlling the industrial plant P(s) using controller C(s), the controller C(s) comparing a measured value from the industrial plant P(s) with a reference setpoint value and calculating a new manipulated output that brings the measured value of the industrial plant P(s) toward the reference setpoint value, wherein G(s) is the transfer function of the open loop system including the controller C(s) and the industrial plant P(s) such that G(s)=C(s)P(s) and G(s), and wherein $w_c$ is the gain crossover frequency.

19. A computer readable storage medium having stored thereon computer executable instructions for performing a method for tuning a fractional-order proportional-integral (PI) controller to control an industrial plant, given a crossover frequency, $w_c$, the method comprising:

for a given PI controller C(s), which is a function of proportional gain $K_p$, integral gain $K_i$, fractional integrator order α, and Laplace variable s, and an industrial plant, P(s), obtaining measurements of $\angle P(jw_c)$ and $P(jw_c)$ using iterative relay feedback tests of the industrial plant P(s);

approximating the derivative of the industrial plant phase, $\angle P(jw_c)$, provided by a relationship $$s_p(w_c) = w_c \frac{d\angle P(jw)}{dw}\bigg|_{w_c} \approx \angle P(jw_c) + \frac{2}{\pi}[\ln|K_g| - \ln|P(jw_c)|],$$

and tuning the controller C(s) based on the approximated derivative of the industrial plant phase, $\angle P(jw_c)$, and controlling the industrial plant P(s) using controller C(s), the controller C(s) comparing a measured value from the industrial plant P(s) with a reference setpoint value and calculating a new manipulated output that brings the measured value of the industrial plant P(s) toward the reference setpoint value, wherein $|K_g|=P(0)$ is a static gain of the industrial plant P(s), and wherein $|P(jw_g)|$ is the gain of the industrial plant P(s) at the frequency $w_c$.

20. A method for tuning a proportional-integral-derivative (PID) controller to control an industrial plant, wherein $w_c$, a tangent frequency, and $\Phi_m$, a tangent phase, are known, the method comprising:

for a given PID controller C(s), which is a function of proportional gain $K_p$, integral time $T_i$, derivative time $T_d$, and Laplace variable s, and an industrial plant, P(s), obtaining measurements of $\angle P(jw_c)$ and $P(jw_c)$ using iterative relay feedback tests of the industrial plant P(s);

approximating the derivative of the industrial plant phase, $\angle P(jw_c)$, provided by a relationship $$s_p(w_c) = w_c \frac{d\angle P(jw)}{dw}\bigg|_{w_c} \approx \angle P(jw_c) + \frac{2}{\pi}[\ln|K_g| - \ln|P(jw_c)|],$$

wherein $|K_g|=P(0)$ is the static gain of the industrial plant P(s);

deriving values for $K_p$, $T_i$, and $T_d$ that satisfy a flat phase condition represented by $$\angle\frac{dG(s)}{ds}\bigg|_{s=jw_c} = \angle G(s)|_{s=jw_c},$$

to complete design of the PID controller C(s);

tuning the controller C(s) based on values derived for $K_p$, $T_i$, and $T_d$ and the approximated derivative of the industrial plant phase $\angle P(jw_c)$; and controlling the industrial plant P(s) using controller C(s), the controller C(s) comparing a measured value from the industrial plant P(s) with a reference setpoint value and calculating a new manipulated output that brings the measured value of the industrial plant P(s) toward the reference setpoint value, wherein $|P(jw_c)|$ is the gain of the industrial plant P(s) at the frequency $w_c$.

21. The method of claim 20, wherein $K_p$ is derived by a relationship $$K_p = \frac{1}{\left|P(jw_c)\sqrt{1+\tan^2(\Phi_m - \angle P(jw_c))}\right|}.$$

22. The method of claim 20, wherein $T_i$ is derived by a relationship $$T_i = \frac{-2}{w_c[s_p(w_c)+\hat{\Phi})+\tan^2(\hat{\Phi})s_p(w_c)]},$$

wherein $\hat{\Phi}=\Phi_m-\angle P(jw_c)$.

23. The method of claim 20, wherein $T_d$ is derived by a relationship $$T_d = \frac{-T_i w_c + 2s_p(w_c) + \sqrt{\Delta}}{2s_p(w_c)w_c^2 T_i},$$

wherein $\Delta=T_i^2 w_c^2 - 8s_p(w_c)T_i w_c - 4T_i^2 w_i^2 s_p^2(w_c)$.

24. The method of claim 20, wherein $\Phi_m$ is selected as one of 0° and 90°.

25. The method of claim 20, wherein s is $s^\alpha$, a fractional-order integrator or differentiator, which is defined by ($-1<\alpha<1$).

26. The method of claim 25, wherein deriving values for $K_p$, $T_i$, $T_d$, and $\alpha$ is accomplished through use of a tuning table.

27. The method of claim 25, further comprising designing a phase shaper X(s), comprising:
selecting $\alpha$ for $s^\alpha$ based on the phase margin requirement for an open loop system G(s);
calculating an approximation transfer function for the fractional-order integrator or differentiator; and
selecting a proper discretization sampling time $T_s$ to determine the position of a constant phase area of the approximation transfer function.

28. The method of claim 27, wherein the transfer function is approximated with fractional-order calculus, using frequency domain-fitting.

29. The method of claim 27, wherein the transfer function is approximated with fractional-order calculus, using a discretization method of a continued fraction expansion (CFE) of the Tustin operator, which yields the approximation $$C(s) = \frac{0.025s^4 + 17.9s^3 + 1252s^2 + 1.67e004s + 3.58e004}{s^4 + 186.7s^3 + 5600s^2 + 3.2e004s + 1.78e004}.$$

30. The method of claim 27, further comprising using a gain $\beta$ to match a gain condition $G(jw_{gc})=\beta C(jw_{gc})X(jw_{gc})P(jw_{gc})=1$, wherein $W_{gc}$ is the desired gain crossover frequency of the open loop system G(s), and $$\left(\frac{1}{10T_s} < w_{gc} < w_c\right).$$

31. A computer readable storage medium having stored thereon computer executable instructions for performing a method for tuning a proportional-integral-derivative (PID) controller to control an industrial plant, wherein $w_c$, a tangent frequency, and $\Phi_m$, a tangent phase, are known, the method comprising:
for a given PID controller C(s), which is a function of proportional gain $K_p$, integral time $T_i$, derivative time $T_d$, and Laplace variable s, and an industrial plant, P(s), obtaining the measurements of $\angle P(jw_c)$ and $|P(jw_c)|$ using iterative relay feedback tests of the industrial plant P(s);
approximating the derivative of the industrial plant phase, $\angle P(jw_c)$, provided by the relationship $$s_p(w_c) = w_c \frac{d\angle P(jw)}{dw}\bigg|_{w_c} \approx \angle P(jw_c) + \frac{2}{\pi}[\ln|K_g| - \ln|P(jw_c)|],$$

wherein $|K_g|=P(0)$ is a static gain of the industrial plant P(s);
deriving values for $K_p$, $T_i$, and $T_d$ that satisfy a flat phase condition represented by $$\angle \frac{dG(s)}{ds}\bigg|_{s=jw_c} = \angle G(s)|_{s=jw_c},$$

to complete design of the PID controller C(s);
tuning the controller C(s) based on values derived for $K_p$, $T_i$, and $T_d$ and the approximated derivative of the industrial plant phase $\angle P(jw_c)$; and
controlling the industrial plant P(s) using controller C(s), the controller C(s) comparing a measured value from the industrial plant P(s) with a reference setpoint value and calculating a new manipulated output that brings the measured value of the industrial plant P(s) toward the reference setpoint value,
wherein $T_i$ is the integral time, wherein $T_d$ is the derivative time, and wherein $|P(jw_c)|$ is the gain of the industrial plant P(s) at the frequency $w_c$.

32. A computer implemented method for controlling a an industrial plant P(s) whose model is unknown, comprising:
for a given proportional-integral (PI) a controller C(s), which is a function of proportional gain $K_p$, integral gain $K_i$, fractional integrator order $\alpha$, and Laplace variable s, iteratively testing the industrial plant P(s) to derive values for controller coefficients $K_p$, $K_i$, and $\alpha$ that satisfy a flat phase condition represented by $\angle dG(s)/ds|_{s=jw_c}=\angle G(s)|_{s=jw_c}$; and
controlling the industrial plant P(s) using controller C(s), the controller C(s) comparing a measured value from the industrial plant P(s) with a reference setpoint value and calculating a new manipulated output that brings the measured value of the industrial plant P(s) toward the reference setpoint value,
wherein G(s) is the transfer function of the open loop system including the controller C(s) and the industrial plant P(s) such that G(s)=C(s)P(s), and
wherein $w_c$ is the gain crossover frequency at which the sensitivity circle tangentially touches the Nyquist curve.

* * * * *